(12) United States Patent
Jiang et al.

(10) Patent No.: US 12,004,099 B2
(45) Date of Patent: Jun. 4, 2024

(54) DATA TRANSMISSION METHOD AND APPARATUS

(71) Applicant: FUJITSU LIMITED, Kawasaki (JP)

(72) Inventors: Qinyan Jiang, Beijing (CN); Meiyi Jia, Beijing (CN); Xin Wang, Beijing (CN); Guoyu Zhang, Beijing (CN); Lei Zhang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 373 days.

(21) Appl. No.: 17/365,168

(22) Filed: Jul. 1, 2021

(65) Prior Publication Data

US 2021/0329577 A1    Oct. 21, 2021

Related U.S. Application Data

(63) Continuation of application No. PCT/CN2019/071488, filed on Jan. 11, 2019.

(51) Int. Cl.
*H04W 72/23* (2023.01)
*H04W 56/00* (2009.01)

(52) U.S. Cl.
CPC ......... *H04W 56/001* (2013.01); *H04W 72/23* (2023.01)

(58) Field of Classification Search
CPC ............................. H04W 56/00; H04W 72/04
See application file for complete search history.

(56) References Cited

U.S. PATENT DOCUMENTS

| | | | | |
|---|---|---|---|---|
| 2019/0037509 | A1* | 1/2019 | Li | ........................ H04L 27/0006 |
| 2019/0327723 | A1 | 10/2019 | Li et al. | |
| 2020/0077353 | A1* | 3/2020 | Liu | ........................ H04W 56/00 |
| 2020/0252192 | A1 | 8/2020 | Gao et al. | |

FOREIGN PATENT DOCUMENTS

| | | |
|---|---|---|
| CN | 108111276 A | 6/2018 |
| CN | 108282881 A | 7/2018 |
| EP | 3 471 296 A1 | 4/2019 |
| WO | 2018/203785 A1 | 11/2018 |
| WO | 2018/230984 A1 | 12/2018 |

OTHER PUBLICATIONS

Extended European search report with the supplementary European search report and the European search opinion Issued by the European Patent Office for corresponding European Patent Application No. 19908631.5-1205, dated Dec. 10, 2021.
Ericsson, "On initial access, RRM, mobility and RLM", Agenda Item: 7.2.2.4.2, 3GPP TSG-RAN WG1 Meeting #95, R1-1813459, Spokane, USA, Nov. 12-16, 2018.

(Continued)

*Primary Examiner* — Michael T Vu
(74) *Attorney, Agent, or Firm* — Myers Wolin, LLC

(57) ABSTRACT

A data transmission method and apparatus, wherein a first SSB set corresponding to a transmission window and a second SSB set taken as a subset of the first SSB set are provided, and at least one SSB in the second SSB set is transmitted in the transmission window, which may be adapted to cell coverage of different situations, and improve flexibility of resource scheduling.

19 Claims, 14 Drawing Sheets

(56) References Cited

OTHER PUBLICATIONS

Interdigital Inc., "Discussion on Procedures for Initial Access and Mobility in NR-U", Agenda Item: 7.2.2.4.2, 3GPP TSG-RAN WG1 Meeting #95, R1-1813221, Spokane, USA, Nov. 12-16, 2018.
First Notification of Office Action and Search Report issued by the China National Intellectual Property Administration for corresponding Chinese Patent Application No. 201980087832.2, dated Jun. 21, 2023, with an English translation.
Notice of Reasons for Refusal issued by the Japan Patent Office for corresponding Japanese Patent Application No. 2021-539036, dated Aug. 23, 2022, with an English translation.
NTT Docomo, Inc., "[D004] ssb-PositionsInBurst in ServingCellConfigCommonSIB", Agenda Item: 10.4.3.2, 3GPP TSG-RAN WG2 Meeting NR-AH #1807, R2-1809896, Montreal, Canada, Jul. 2-6, 2018.
Huawei et al., "Initial access in NR unlicensed", Agenda Item: 7.2.2.4.2, 3GPP TSG-RAN WG1 Meeting #95, R1-1812195, Spokane, USA, Nov. 12-16, 2018.
Ericsson, "On initial access, RRM, mobility and RLM", Agenda Item: 7.2.2.4.2, 3GPP TSG-RAN WG1 Meeting #94, R1-1809205, Gothenburg, Sweden, Aug. 20-24, 2018.
Spreadtrum Communications, "Discussion on initial access and mobility in NR-U", Agenda Item: 7.2.2.4.2, 3GPP TSG-RAN WG1 Meeting #94bis, R1-1811014, Chengdu, China, Oct. 8-12, 2018.
Communication pursuant to Article 94(3) EPC issued by the European Patent Office for corresponding European Patent Application No. 19908631.5, dated Aug. 17, 2023.
Notice of Preliminary Rejection issued by the Korean Intellectual Property Office for corresponding Korean Patent Application No. 10-2021-7020743, dated Jul. 15, 2022, with an English translation.
Examination Report issued by the Patent Office of India for corresponding Indian Patent Application No. 202137029609, dated Feb. 25, 2022, with an English translation.
International Search Report and Written Opinion of the International Searching Authority issued by the China National Intellectual Property Administration for corresponding International Patent Application No. PCT/CN2019/071488, dated Sep. 30, 2019, with an English translation.
Xiaomi, "SSB transmission in NRU initial access", Agenda Item: 7.2.2.4.2, 3GPP TSG-RAN WG1 Meeting #95, R1-1813363, Spokane, USA, Nov. 12-16, 2018.
Hearing Notice issued by the Indian Patent Office for corresponding Indian Patent Application No. 202137029609, mailed on Dec. 22, 2023, with an English translation.

* cited by examiner

DATA TRANSMISSION METHOD AND APPARATUS

CROSS-REFERENCE TO RELATED APPLICATION

This application is a continuation application of International Application PCT/CN2019/071488 filed on Jan. 11, 2019 and designated the U.S., the entire contents of which are incorporated herein by reference.

TECHNICAL FIELD

This disclosure relates to the field of communications, and in particular to a data transmission method and apparatus.

BACKGROUND

Subjects related to next-generation wireless communication systems are under study in the 3rd Generation Partnership Project (3GPP). In the next-generation wireless communication systems, such as new radio (NR) system, synchronization signal blocks (SSBs) in a period are transmitted in a half sub-frame, a length of a half sub-frame being 5 ms.

In an NR system, for different frequency bands and subcarrier spacings, a time-domain position of an SSB in a half sub-frame is predefined, and SSBs at different time-domain positions are indicated by SSB indices, and a demodulation reference signal (DMRS) and a physical broadcast channel (PBCH) in an SSB may indicate an SSB index to which the SSB corresponds. For example, for 3-6 GHz frequency bands, a half sub-frame includes predefined time-domain positions of 8 SSBs, these 8 SSBs corresponding to SSB indices of values 0-7 one by one. Therefore, after a user equipment (UE) receives an SSB, it may determine half sub-frame timing according to the SSB index to which the SSB corresponds, and then may determine frame timing with reference to other information.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that in an NR system, only licensed bands are taken into account for design of SSBs. For example, for 3-6 GHz bands, a half sub-frame includes 8 predefined SSBs. In a licensed band, a network equipment may predetermine and guarantee whether to transmit an SSB.

However, in some bands, such as an unlicensed band or a sharing spectrum, in order to share spectrum resources fairly and efficiently, a device needs to determine that a channel is not occupied by another device in a channel access method/process, so as to transmit data, hence, it is possible that the network equipment is unable to transmit an SSB due to that the channel is occupied by the other device. In addition, transmit power of the SSB and the number of SSBs that may be transmitted or a length of time within a certain period may also be limited by regulatory requirements. Therefore, when the design of SSBs in the NR system is directly adopted, it is possible that cell coverage at some bands cannot be guaranteed.

Addressed to at least one of the above problems, embodiments of this disclosure provide a data transmission method and apparatus.

According to a first aspect of the embodiments of this disclosure, there is provided a data transmission apparatus, configured at a network equipment side, the apparatus including: a first transmitting unit configured to, in a first transmission window, transmit at least one SSB in a second SSB set corresponding to the first transmission window, or not to transmit an SSB; wherein the second SSB set is a subset of a first SSB set, SSBs in the first SSB set corresponding to different time-domain positions in the first transmission window.

According to a second aspect of the embodiments of this disclosure, there is provided a data transmission apparatus, configured at a user equipment side, the apparatus including: a transceiving unit configured to receive a downlink signal and/or channel or transmit an uplink signal and/or channel according to time-domain positions of SSBs in a second SSB set and/or quasi-colocation relationships between the SSBs in the second SSB set, the second SSB set being a subset of a first SSB set, SSBs in the first SSB set corresponding to different time-domain positions in a transmission window.

According to a third aspect of the embodiments of this disclosure, there is provided a network equipment, including the apparatus as describe in the first aspect of the embodiments of this disclosure.

According to a fourth aspect of the embodiments of this disclosure, there is provided a user equipment, including the apparatus as describe in the second aspect of the embodiments of this disclosure.

According to a fifth aspect of the embodiments of this disclosure, there is provided a communication system, including the network equipment as describe in the third aspect of the embodiments of this disclosure and/or the user equipment as describe in the fourth aspect of the embodiments of this disclosure.

According to a sixth aspect of the embodiments of this disclosure, there is provided a data transmission method, applicable to a network equipment side, the method including: in a first transmission window, transmitting at least one SSB in a second SSB set corresponding to the first transmission window, or not transmitting an SSB; wherein the second SSB set is a subset of a first SSB set, SSBs in the first SSB set corresponding to different time-domain positions in the first transmission window.

According to a seventh aspect of the embodiments of this disclosure, there is provided a data transmission method, applicable to a user equipment side, the method including: receiving a downlink signal and/or channel or transmitting an uplink signal and/or channel according to time-domain positions of SSBs in a second SSB set and/or quasi-colocation relationships between the SSBs in the second SSB set, the second SSB set being a subset of a first SSB set, SSBs in the first SSB set corresponding to different time-domain positions in a transmission window.

According to an eighth aspect of the embodiments of this disclosure, there is provided a computer readable program, which, when executed in a data transmission apparatus or a network equipment, will cause the data transmission apparatus or the network equipment to carry out the data transmission method described in the sixth aspect.

According to a ninth aspect of the embodiments of this disclosure, there is provided a computer storage medium, including a computer readable program, which will cause a data transmission apparatus or a network equipment to carry out the data transmission method described in the sixth aspect.

According to a tenth aspect of the embodiments of this disclosure, there is provided a computer readable program, which, when executed in a data transmission apparatus or a user equipment, will cause the data transmission apparatus or the user equipment to carry out the data transmission method described in the seventh aspect.

According to an eleventh aspect of the embodiments of this disclosure, there is provided a computer storage medium, including a computer readable program, which will cause a data transmission apparatus or a user equipment to carry out the data transmission method described in the seventh aspect.

An advantage of the embodiments of this disclosure exists in that a first SSB set corresponding to a transmission window and a second SSB set taken as a subset of the first SSB set are provided, and at least one SSB in the second SSB set is transmitted in the transmission window, which may be adapted to cell coverage of different situations, and improve flexibility of resource scheduling.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

Figure 1:
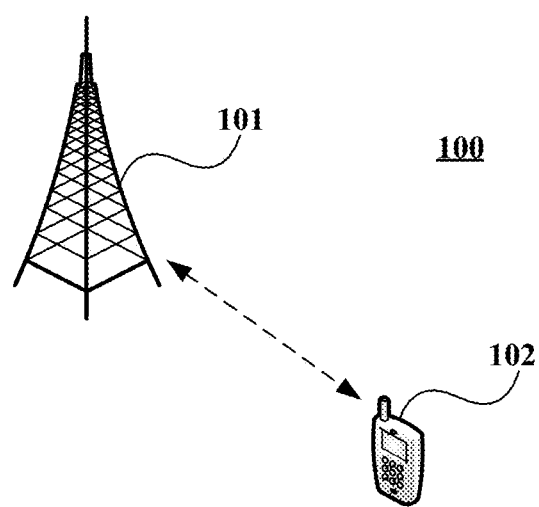
FIG. 1 is schematic diagram of a communication system of an embodiment of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network equipment", for example, refers to an equipment in a communication system that accesses a user equipment to the communication network and provides services for the user equipment. The network equipment may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

In the embodiments of this disclosure, the base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" refers to, for example, equipment accessing to a communication network and receiving network services via a network equipment, and may also be referred to as "terminal equipment (TE)". The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Scenarios in the embodiments of this disclosure shall be described below by way of examples; however, this disclosure is not limited thereto.

FIG. 1 is a schematic diagram of a communication system of an embodiment of this disclosure, in which a case where a user equipment and a network equipment are taken as examples is schematically shown. As shown in FIG. 1, a communication system 100 may include a network equipment 101 and a terminal equipment 102. For the sake of simplicity, description is given in FIG. 1 by taking one user equipment as an example. And the network equipment 101 may be, for example, a network equipment gNB in NR.

In the embodiment of this disclosure, existing traffics or traffics that may be implemented in the future may be performed between the network equipment 101 and the user equipment 102. For example, such traffics may include but not limited to enhanced mobile broadband (eMBB), massive machine type communication (MTC), and ultra-reliable and low-latency communication (URLLC), etc.

In the embodiment of this disclosure, the user equipment 102 may transmit data to the network equipment 101 in, for example, a grant-free transmission manner. The network equipment 101 may receive data transmitted by one or more user equipments 102, and feed back information (such as acknowledgement ACK/non-acknowledgement NACK) to the user equipment 102, and the user equipment 102 may acknowledge termination of the transmission process according to the feedback information, or may further perform new data transmission, or may perform data retransmission.

Various implementations of the embodiments of this disclosure will be described below with reference to the accompanying drawings. These implementations are exemplary only, and are not intended to limit this disclosure.

Embodiment 1

The embodiment of this disclosure provides a data transmission method, applicable to a network equipment.

Figure 2:
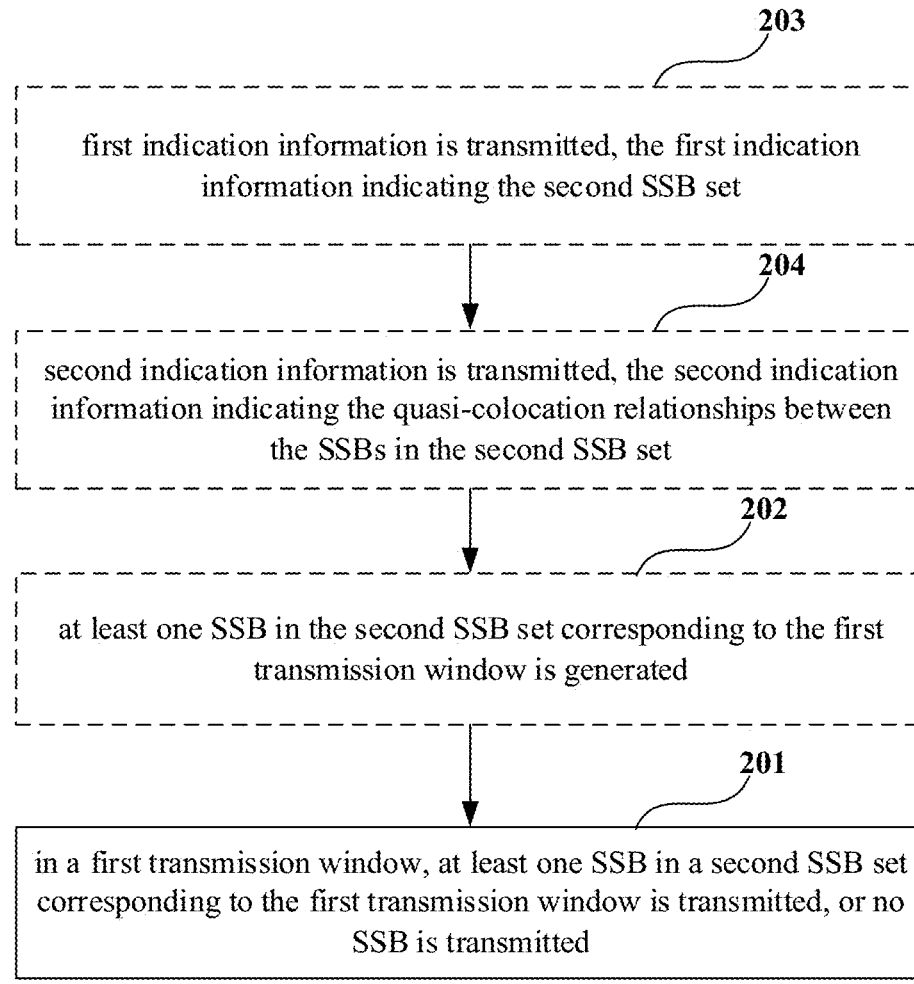
FIG. 2 is a schematic diagram of the data transmission method of Embodiment 1 of this disclosure.

FIG. 2 is a schematic diagram of the data transmission method of Embodiment 1 of this disclosure. As shown in FIG. 2, the method includes:

Step 201: in a first transmission window, at least one SSB in a second SSB set corresponding to the first transmission window is transmitted, or no SSB is transmitted; the second SSB set is a subset of a first SSB set, SSBs in the first SSB set corresponding to different time-domain positions in the first transmission window.

Hence, the first SSB set corresponding to the transmission window and the second SSB set taken as a subset of the first SSB set are provided, and at least one SSB in the second SSB set is transmitted in the transmission window, which may be adapted to cell coverage of different situations, and improve flexibility of resource scheduling. In this embodiment, the first transmission window may be any one of multiple transmission windows, the multiple transmission windows being spaced at a certain period in a timeline.

In this embodiment, the time-domain positions, QCL relationships and the number of SSBs transmitted in different transmission windows may be identical or different.

In this embodiment, a transmission window may be a periodic time transmission unit. For example, the transmission window is one of an SSB transmission window, a DRS (discovery reference signal) transmission window, a half sub-frame and a subframe.

In this embodiment, each SSB in the first SSB set corresponds to a different time-domain position of the first transmission window; the number of SSBs in the first SSB set may be set as actually demanded.

For example, the number of SSBs in the first SSB set may be more than 8, such as 16, 32, or 64.

In this embodiment, the first SSB set is predefined.

Here, predefinition refers to at least one of the number, time-domain positions and quasi-colocation relationships of the SSBs included in the first SSB set defined in the standards. The first SSB set is, for example, defined according to unlicensed frequency band regulatory requirements, so as to share spectrum resources as fairly as possible.

In this embodiment, according to the quasi-colocation relationship between SSBs, that is, according to spatial information corresponding to the SSBs, such as a second index, and a beam identifier, SSBs corresponding to the same and unique spatial information are quasi-colocated.

For example, the first SSB set is related to frequency bands (or frequency ranges) and/or sub-carrier spacings (SCSs), that is, first SSB sets are correspondingly defined for different frequency bands (or frequency ranges) and/or sub-carrier spacings, respectively.

Taking a frequency band as an example, for example, for a frequency band of F1~F2 kHz, the first SSB set includes 8 SSBs, SSB1~SSB8, and for a frequency band of F3~F4 kHz, the second SSB set includes 16 SSBs, SSB1~SSB16. And settings for other frequency bands are similar thereto.

For example, for the time-domain positions of the SSBs, a correspondence between the SSBs and the first index is predefined, or a relationship between the SSBs and the second index and the third index is predefined;

and regarding the quasi-colocation relationship of the SSBs, a correspondence between the SSBs and the second index is predefined.

In this embodiment, the SSBs in the first SSB set correspond to different time-domain positions of the first transmission window. The different time-domain positions here mean that they are not completely identical, that is, time-domain positions of any two SSBs in the first SSB set may be spaced apart or may be partially overlapped.

Figure 3:
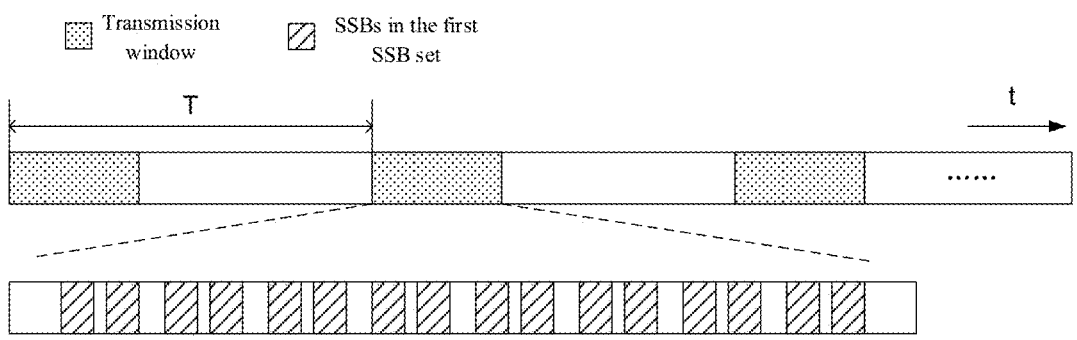
FIG. 3 is a schematic diagram of a transmission window and a first SSB set of Embodiment 1 of this disclosure.

FIG. 3 is a schematic diagram of the transmission window and the first SSB set in Embodiment 1 of this disclosure. As shown in FIG. 3, a plurality of transmission windows are periodically set on the timeline, and a period T is, for example, 40 ms. The first transmission window is one of the plurality of transmission windows, and corresponds to the first transmission window. The first SSB set includes 16 SSBs, and the 16 SSBs are spaced apart from each other in the time domain.

Figure 4:
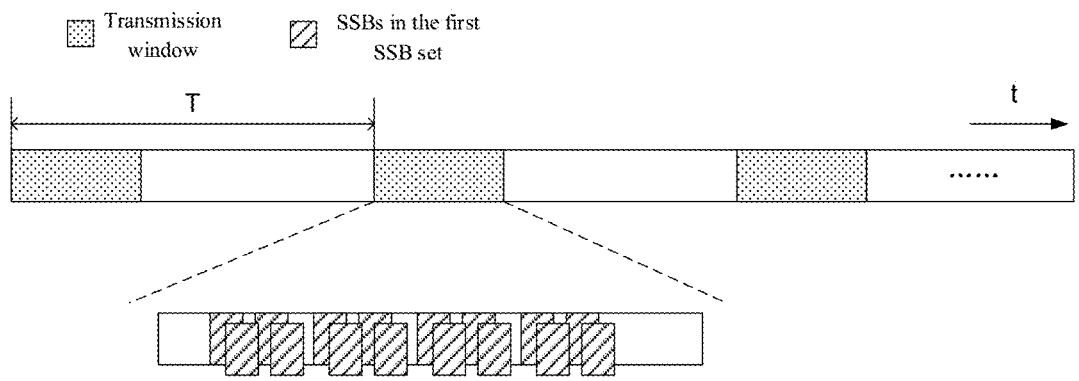
FIG. 4 is another schematic diagram of the first SSB set of Embodiment 1 of this disclosure.

FIG. 4 is another schematic diagram of the first SSB set of Embodiment 1 of this disclosure. As shown in FIG. 4, the first SSB set includes 16 SSBs, and these 16 SSBs partially overlap in the time domain.

In this embodiment, an SSB in the first SSB set may be referred to as a nominal SSB;

however, this name is only for distinguishing it from an existing SSB, and other names may also be used.

In this embodiment, the second SSB set is a subset of the first SSB set. For example, the second SSB set may be the first SSB set itself, or it may be a proper subset of the first SSB set, that is, it contains a part of SSBs in the first SSB set.

In this embodiment, SSBs in the second SSB set may be referred to as candidate SSBs; however, this name is only for distinguishing them from existing SSBs, and other names may also be used.

For example, for an SSB in the first SSB set, it is a nominal SSB, and when the nominal SSB belongs to the second SSB set, the nominal SSB is also a candidate SSB.

In step 201, at least one SSB in the second SSB set corresponding to the first transmission window is transmitted in the first transmission window.

In this embodiment, for an unlicensed band or a sharing spectrum, at least one SSB in the second SSB set corresponding to the first transmission window is transmitted in the first transmission window according to a channel detection result, or no SSB is transmitted.

In this embodiment, the second SSB set includes at least one SSB.

For example, when none of the time-domain positions corresponding to the SSBs in the second SSB set in the first transmission window accesses to the channel, no SSB is transmitted.

For example, for the first transmission window, a minimum number I of times of transmission of SSBs may be set, and when the SSBs are transmitted in the first transmission window, at least I SSBs are transmitted. And when the base station fails in accessing to the channel before a time-domain position corresponding to a first SSB in latter I SSBs in the second SSB set in the first transmission window, no SSB is transmitted.

At this moment, the number of SSBs with non-overlapping time-domain positions in the second SSB set is greater than or equal to 1. And the minimum number I of times of transmission is predefined.

Here, predefinition refers to that a specific value of I is defined in standards. For example, I is defined according to the regulatory requirements of unlicensed bands, so as to share spectrum resources as fairly as possible.

For example, I is related to frequency bands (or frequency ranges) and/or subcarrier spacings (SCSs), that is, the minimum number I of times of transmission is correspondingly defined for different frequency bands (or frequency ranges) and/or subcarrier spacings, respectively.

Taking a frequency band as an example, for example, for a frequency band of F1~F2 kHz, I=4, and for a frequency band of F3~F4 kHz, I=2. And settings for other frequency bands are similar thereto.

In this embodiment, for the first transmission window, a maximum number of transmitted SSBs may be set, denoted by X.

In this embodiment, the maximum number X of times of transmission is predefined. Here, predefinition refers to that a specific value of X is defined in standards. For example, I is defined according to the regulatory requirements of unlicensed bands, so as to share spectrum resources as fairly as possible.

For example, X is related to frequency bands (or frequency ranges) and/or subcarrier spacings (SCSs), that is, the maximum number X of times of transmission is correspondingly defined for different frequency bands (or frequency ranges) and/or subcarrier spacings, respectively.

Taking a frequency band as an example, for example, for a frequency band of F1~F2 kHz, X=8, and for a frequency band of F3~F4 kHz, X=4. And settings for other frequency bands are similar thereto.

For example, the number of SSBs in the second SSB set is greater than or equal to the maximum number of transmitted SSBs to which the second SSB set corresponds.

Figure 5:
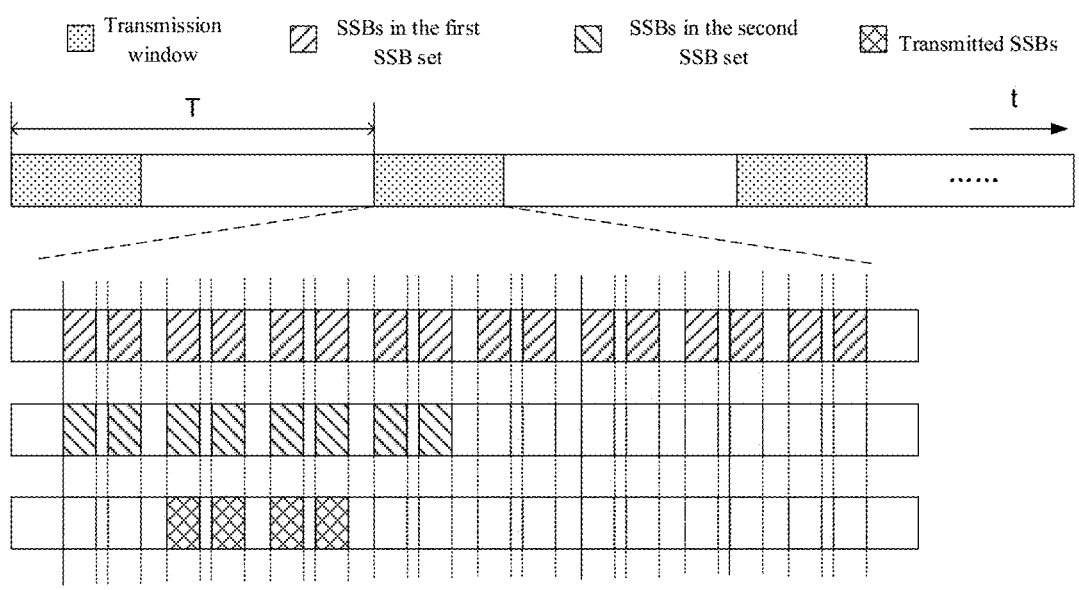
FIG. 5 is a schematic diagram of SSBs in the first transmission window of Embodiment 1 of this disclosure.

FIG. 5 is a schematic diagram of the SSBs in the first transmission window of Embodiment 1 of this disclosure. As shown in FIG. 5, a plurality of transmission windows are periodically set on the timeline, and a period T is, for example, 40 ms. The first transmission window is one of multiple transmission windows, and corresponding to the first transmission window, the first SSB set contains 16 SSBs, the second SSB set contains 8 SSBs, and the transmitted SSBs are 4 SSBs therein, namely, X=4.

In this embodiment, the number of SSBs in the second SSB set may also be related to the maximum number X of transmission. For example, in order to have sufficient SSB transmission occasions to ensure cell coverage at the unlicensed band, the number of SSBs in the second SSB set is greater than the maximum number X of transmission. That is, at least one SSB in the second SSB set may not be transmitted in the first transmission window.

In this embodiment, two SSBs in the second SSB set or the first SSB set are quasi-colocated (QCLed). That is, in the second SSB set or in the first SSB set, there exist at least two quasi-colocated SSBs. In this embodiment, as shown in FIG. 2, the method may further include:

Step 202: at least one SSB in the second SSB set corresponding to the first transmission window is generated.

In this embodiment, a relationship between step 202 and step 201 is not limited.

For example, the second SSB set corresponding to the first transmission window includes four SSBs, SSB1, SSB2, SSB3 and SSB4. For the first transmission window, in step 202, SSB1, SSB2, SSB3 and SSB4 are generated, and in step 201, SSB1 and SSB4 are transmitted, and SSB2 and SSB3 are not transmitted, or SSB2 and SSB3 are transmitted, SSB1 and SSB4 are not transmitted.

For another example, the second SSB set corresponding to the first transmission window includes four SSBs, SSB1, SSB2, SSB3 and SSB4. For the first transmission window, SSB1 may first be generated in step 202, then SSB1 is transmitted in step 201, thereafter, SSB2 is generated in step 202, and then SSB2 is transmitted in step 202.

For a further example, the second SSB set corresponding to the first transmission window includes four SSBs, SSB1, SSB2, SSB3 and SSB4, but in step 202, only SSB1 and SSB2 are generated, while SSB3 and SSB4 are not generated.

In this embodiment, the second SSB set is predefined or preconfigured.

For the predefinition, the SSBs included in the second SSB set are defined in the standards based on the first SSB set.

Here, the predefinition refers to at least one of the number of SSBs included in the second SSB set, the time-domain positions and the quasi-colocation relationships defined in the standards. The second SSB set is defined, for example, according to unlicensed frequency band regulatory requirements, so as to share spectrum resources as fairly as possible.

For example, the second SSB set is related to frequency bands (or frequency ranges) and/or subcarrier spacings (SCSs), that is, the second SSB set is correspondingly defined for different frequency bands (or frequency ranges) and/or subcarrier spacings, respectively.

Taking frequency bands as an example, for example, for a frequency band F1~F2 kHz, the second SSB set includes SSB1 and SSB2, and for a frequency band F3~F4 kHz, the second SSB set includes SSB1, SSB2, SSB3 and SSB4. And settings for other frequency bands are similar thereto. For the case of preconfiguration, as shown in FIG. 2, the method may further include:

Step 203: first indication information is transmitted, the first indication information indicating the second SSB set.

For example, before step 201 and step 202, step 203 is executed, that is, the network equipment preconfigures the second SSB set and informs the UE of the second SSB set.

In this embodiment, the first indication information may be transmitted via high-layer signaling or a physical layer instruction.

For example, the high-layer signaling is RRC signaling or an MAC CE.

In this embodiment, the first indication information corresponds to a first parameter or a second parameter, the first parameter being an existing parameter, and the second parameter being a new parameter. That is, the first indication information uses the first parameter or the second parameter.

In this embodiment, the existing parameter is an IE (information element) already supported by RRC signaling in Rel-15 NR. Using (or reusing) an existing parameter refers to use of a parameter having the same name as an existing parameter, and information and/or an indication method referred thereby may be different according to actual situations; for example, for licensed bands and unlicensed bands, the information and/or indication method referred to by the existing parameter is/are different.

In this embodiment, using a new parameter refers to using a newly introduced parameter IE.

For example, in a case of transmitting the first indication information via RRC signaling, an existing parameter, such as ssb-PositionsInBurst, may be used for indication, or a new parameter, such as ssb-PositionsinBurst-NRU, may also be used for indication.

For example, for a licensed band, ssb-PositionsInBurst indicates a set consisting of transmitted SSBs, and for an unlicensed band, ssb-PositionsInBurst (a new parameter, such as ssb-PositionsinBurst-NRU) indicates the second SSB set (a set of candidate SSBs).

For another example, for an unlicensed band, the SSBs transmitted in the second SSB set indicated by ssb-PositionsInBurst (a new parameter, such as ssb-PositionsinBurst-NRU) are dependent on channel access, or are dependent on channel access and the above maximum number of transmitted SSBs; and for a licensed band, they are not dependent on channel access or the above maximum number of transmitted SSBs.

For a further example, for a licensed band, time-domain positions of SSBs in an SSB set indicated by ssb-PositionsInBurst may not be overlapped; and for an unlicensed band, time-domain positions of SSBs in an SSB set indicated by ssb-PositionsInBurst (a new parameter, such as ssb-PositionsinBurst-NRU) may be overlapped.

For still another example, for Rel-15, ssb-PositionsInBurst indicates a set consisting of transmitted SSBs; and for Rel-16 or other subsequent versions, ssb-PositionsInBurst (a new parameter, such as ssb-PositionsinBurst-NRU) indicates the above second SSB set (a set of candidate SSBs).

For yet another example, for Rel-15, ssb-PositionsInBurst (a new parameter, such as ssb-PositionsinBurst-NRU) indicates that transmitted SSBs in the second SSB set are dependent on channel access, or are dependent on channel access and the above maximum number of transmitted SSBs; and for Rel-16 or other subsequent versions, they are not dependent on channel access or the above maximum number of transmitted SSBs.

For yet still another example, for Rel-15, time-domain positions of SSBs in an SSB set indicated by ssb-PositionsInBurst may not be overlapped; and for Rel-16 or other subsequent versions, time-domain positions of SSBs in an SSB set indicated by ssb-PositionsInBurst (a new parameter, such as ssb-PositionsinBurst-NRU) may be overlapped.

In this embodiment, the first indication information may directly indicate the second SSB set.

For example, which SSBs in the first SSB set belong to the second SSB set, or the number of indicated SSBs, starting positions and ending positions of the SSBs in the second SSB set are indicated by a bit-map.

For example, the first indication information includes N bits, which correspond to the SSBs in the first SSB set one by one. 1 denotes that a corresponding SSB is an SSB in the second SSB set, and 0 denotes that a corresponding SSB is not an SSB in the second SSB set.

Figure 6:
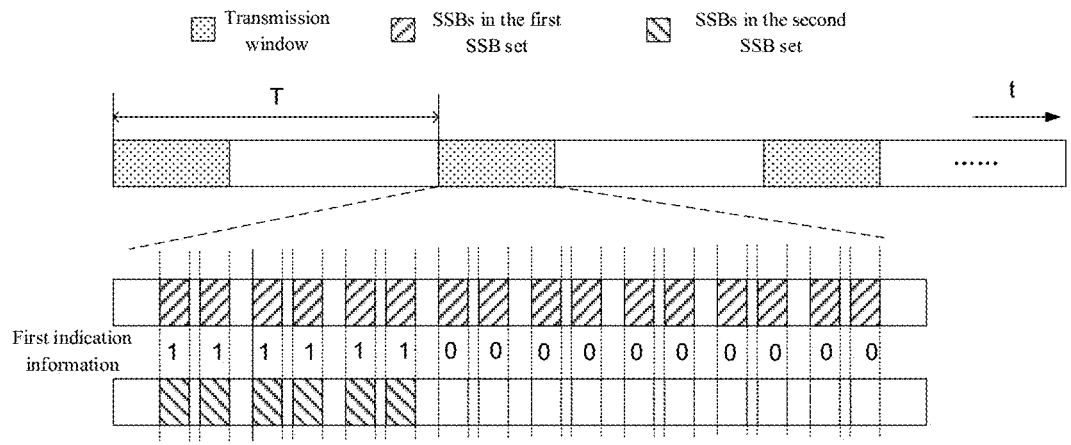
FIG. 6 is a schematic diagram of indicating a second SSB set of Embodiment 1 of this disclosure.

FIG. 6 is a schematic diagram of indicating the second SSB set of Embodiment 1 of this disclosure. As shown in FIG. 6, the first indication information includes 16 bits, which are 1111110000000000 in succession, and SSBs in the first SSB set corresponding to "1" are the SSBs in the second SSB set.

For another example, the first SSB set is divided into M groups, and the first indication information includes M bits, which correspond to groups of SSBs in the first SSB set one by one. 1 denotes that SSBs in a corresponding group are SSBs in the second SSB set, and 0 denotes that SSBs in a corresponding group are not SSBs in the second SSB set.

In this embodiment, the first indication information may also indicate the second SSB set based on the time-domain positions of the SSBs in the first SSB set and/or the quasi-colocation relationships of the SSBs in the first SSB set.

For example, the first indication information indicates the second SSB set based on a correspondence between the SSBs in the first SSB set and the first index, the first index indicates time-domain positions of the SSBs in the first SSB set in the transmission window, and the SSBs in the first SSB set correspond to values of the first index one by one.

For another example, the first indication information indicates the second SSB set based on the correspondence between the SSBs in the first SSB set and the second index, and the second index indicates the quasi-colocation relationships between the SSBs in the first SSB set, in other words, the second index indicates spatial domain information (such as beam identifiers) to which the SSBs in the first SSB set correspond, and SSBs in the first SSB set corresponding to the same second index are quasi-colocated. The first SSB set includes two SSBs corresponding to the same second index value. In this embodiment, the two SSBs corresponding to the same second index value are quasi-colocated.

For example, the second index has Y values, and the first indication information includes Y bits, which correspond to the values of the second index. 1 denotes that SSBs corresponding to the corresponding second index are SSBs in the second SSB set, and 0 denotes that SSBs corresponding to the corresponding second index are not SSBs in the second SSB set.

Figure 7:
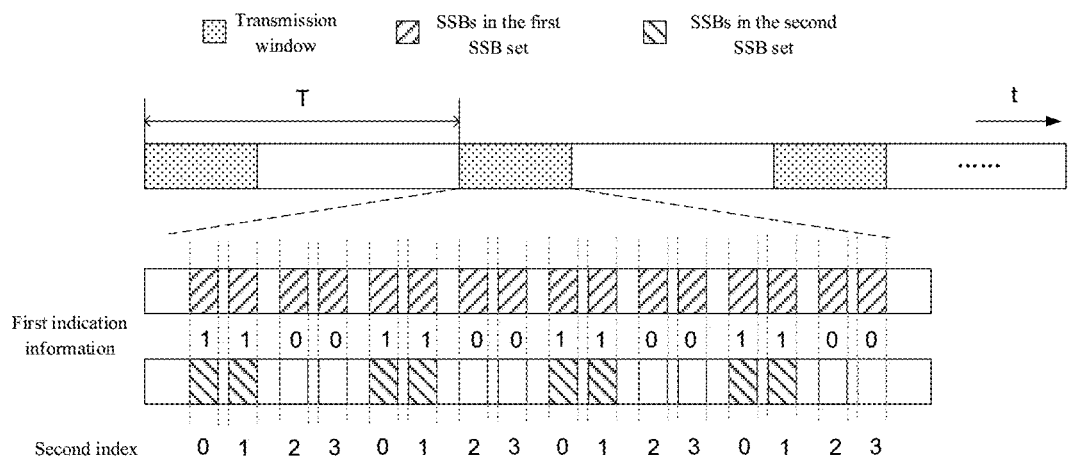
FIG. 7 is another schematic diagram of indicating a second SSB set of Embodiment 1 of this disclosure.

FIG. 7 is another schematic diagram of indicating the second SSB set of Embodiment 1 of this disclosure. As shown in FIG. 7, the first indication information contains 4 bits, which are 1100 in succession, the second index has 4 values, which are 0123 in succession, the first SSB set contains 16 SSBs, and second indices corresponding thereto are 0123012301230123 in succession; hence, SSBs corresponding to second indices (with values 0 and 1) corresponding to 1 are SSBs in the second SSB set.

For another example, the first index or the second index is divided into Y groups, and the first indication information includes Y bits, which correspond to the groups of the first index or the second index one by one. 1 denotes that SSBs corresponding to corresponding groups of the first index or second index are SSBs in the second SSB set, and 0 denotes that SSBs corresponding to corresponding groups of the first index or second index are not SSBs in the second SSB set.

In this embodiment, the first indication information also indicates the second SSB set based on a correspondence between the SSBs in the first SSB set and the third index; the third index indicates sequence numbers or time-domain positions of SSBs in a group consisting of SSBs in the first SSB set corresponding to identical second index values, and SSBs in the group correspond to values of the third index one by one.

For example, the second index has Y values, the SSBs with identical second index values form Y groups, and the first indication information includes 2Y bits; former Y bits indicate whether an SSB corresponding to a second index value is an SSB in the second SSB set, and latter Y bits indicate whether an SSB corresponding to a third index value is an SSB in the second SSB set.

Figure 8:
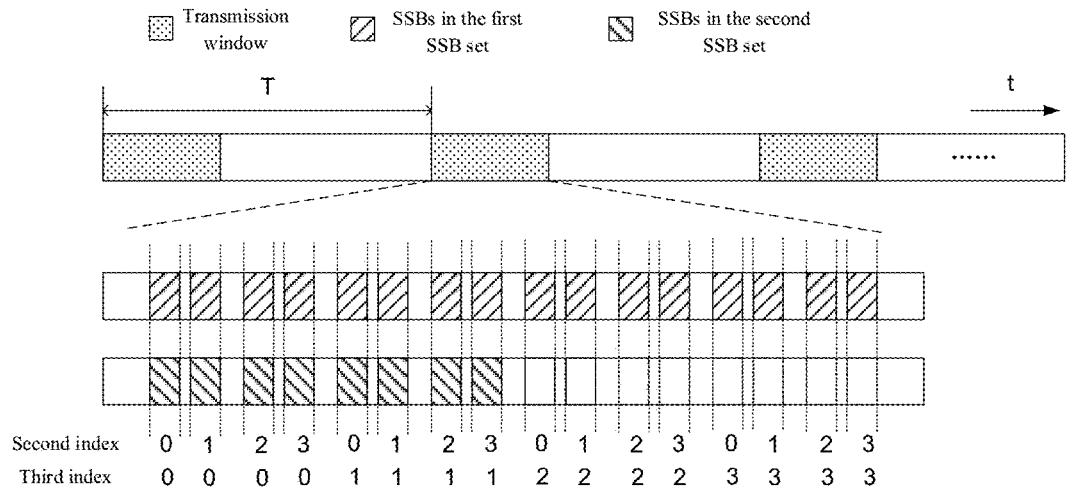
FIG. 8 is a further schematic diagram of indicating a second SSB set of Embodiment 1 of this disclosure.

FIG. 8 is a further schematic diagram of indicating the second SSB set of Embodiment 1 of this disclosure. As shown in FIG. 8, the first indication information contains 8 bits, which are 11000110 in succession, and the second index has 4 values, which are 0123 in succession, SSBs with identical second index values form 4 groups, the first SSB set contains 16 SSBs, second indices corresponding thereto are 0123012301230123 in succession, and third index indices corresponding thereto are 0000111122223333 in succession; hence, values of a second index to which 1 in former 4 bits in the first indication information corresponds are 0 and 1, and sequence numbers of a group to which 1 in latter 4 bits therein corresponds are 1 and 2.

In this embodiment, an SSB in the first SSB set may correspond to a second index, or may correspond to multiple second indices.

When an SSB corresponds to multiple second indices, the second SSB set may be indicated according to a correspondence between the SSB and the multiple second indices.

Figure 9:
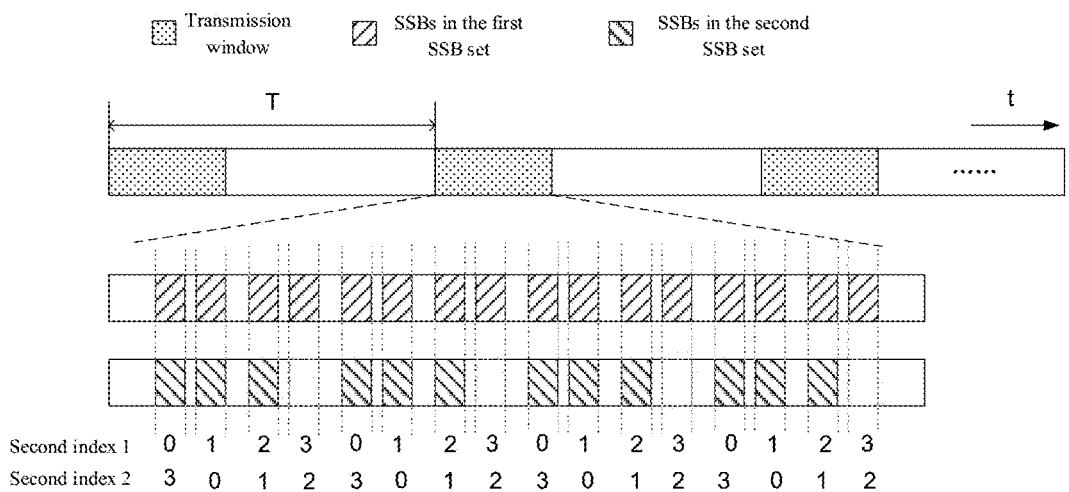
FIG. 9 is still another schematic diagram of indicating a second SSB set of Embodiment 1 of this disclosure.

FIG. 9 is still another schematic diagram of indicating the second SSB set of Embodiment 1 of this disclosure. As shown in FIG. 9, the first indication information contains 4 bits, which are 1100 in succession, an SSB in the first SSB set corresponds to two second indices, denoted by second index 1 and second index 2, the second index 1 having 4 values, which are 0123 respectively, and the second index 2 also having 4 values, which are 3012 respectively; hence, SSBs corresponding to the second index 1 (with values 0 and 1) and the second index 2 (with values 3 and 0) to which 1 corresponds are all SSBs in the second SSB set.

In this embodiment, the second SSB set is indicated in step 203, that is, the time-domain positions of the SSBs in the second SSB set are indicated. Furthermore, the quasi-colocation relationships between the SSBs in the second SSB set may be indicated.

As shown in FIG. 2, the method may further include:

Step 204: second indication information is transmitted, the second indication information indicating the quasi-colocation relationships between the SSBs in the second SSB set.

In step 204, the UE may determine the quasi-colocation relationships between the SSBs in the second SSB set.

In this embodiment, step 203 and step 204 may be executed sequentially or simultaneously, and an order of executing these steps is not limited in the embodiment of this disclosure.

Moreover, when the UE does not receive the second indication information (including a case where the second indication information is not transmitted by the network equipment, and a case where the second indication information is transmitted by the network equipment but is not received by the UE), as the second SSB set is the first SSB set or a proper subset of the first SSB set, the quasi-colocation relationships between the SSBs in the second SSB set may also be known (determined) according to the predefined quasi-colocation relationships between the SSBs in the first SSB set.

For example, the quasi-colocation relationships between the SSBs in the second SSB set is known according to the predefined correspondence between the SSBs in the first SSB set and the second index.

For example, it is predefined that any SSB in first SSB set corresponds to only one second index value, hence, SSBs corresponding to identical second index values are quasi-colocated, and SSBs corresponding to different second index values are not quasi-colocated. The quasi-colocation relationships between the SSBs in the second SSB set are identical to the quasi-colocation relationships between the corresponding SSBs in the first SSB set.

For another example, at least one SSB in the predefined first SSB set corresponds to two or more second index values, hence, corresponding SSBs with at least one identical second index value may be quasi-colocated, and corresponding SSBs with any different second index value are not quasi-colocated. The quasi-colocation relationships between the SSBs in the second SSB set are identical to the quasi-colocation relationships between the corresponding SSBs in the first SSB set.

In this embodiment, the second indication information may further indicate that SSBs, which are not quasi-colocated based on the predefined quasi-colocation relationships between the SSBs in the first SSB set (SSBs with any second index values that are all different), are quasi-colocated, or, the second indication information may further indicate that SSBs, which are possibly quasi-colocated based on the predefined quasi-colocation relationships (SSBs with at least one second index value that is identical), are quasi-colocated.

For example, according to the predefined correspondence between the SSBs in the first SSB set and the second index, the first SSB and the second SSB are not quasi-colocated (and values of any corresponding second indices are different), and the second indication information may indicate that the first SSB and the second SSB in the second SSB set are quasi-colocated. After receiving the second indication information, the UE may determine according to the second indication information that the first SSB and the second SSB are quasi-co-located.

For another example, according to the predefined correspondence between the SSBs in the first SSB set and the second index, the first SSB and the second SSB may be quasi-colocated (SSBs corresponding to at least one identical second index value), and the second indication information may indicate that the first SSB and the second SSB in the second SSB set are quasi-colocated. After receiving the second indication information, the UE may determine according to the second indication information that the first SSB and the second SSB are quasi-colocated.

In this embodiment, the second indication information may be indicated by multiplexing the first indication information, or the second indication information may be implicitly indicated by the first indication information.

Figure 10:
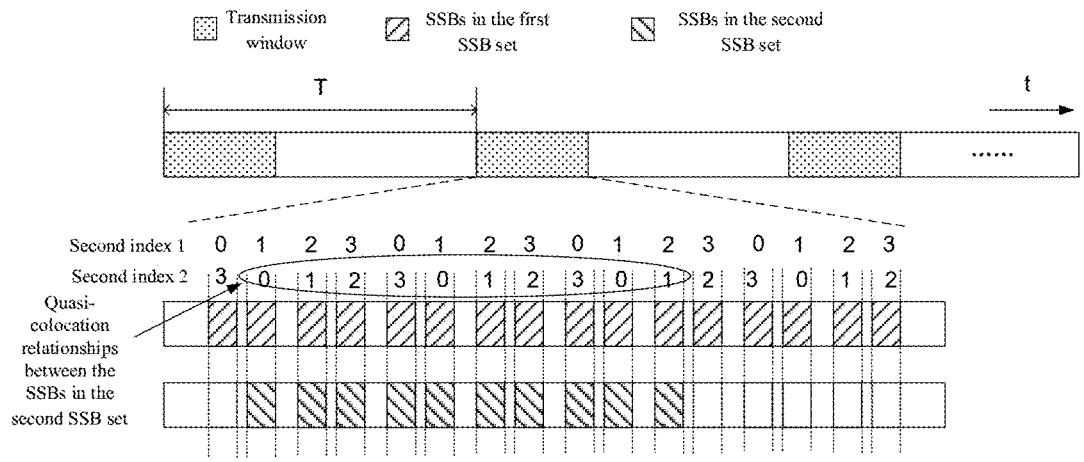
FIG. 10 is a schematic diagram of indicating a quasi-colocation relationship between SSBs in the second SSB set of Embodiment 1 of this disclosure.

FIG. 10 is a schematic diagram of indicating the quasi-colocation relationship between SSBs in the second SSB set of Embodiment 1 of this disclosure. As shown in FIG. 10, the SSBs in the first SSB set correspond to the second index 1 and the second index 2, and the quasi-colocation relationship between the SSBs in the second SSB set may be implicitly indicated by the value of the second index 2, that is, SSBs with identical values of the second index 2 are quasi colocated.

Generally, the second indication information is unable to indicate that SSBs, which are quasi-colocated based on the predefined quasi-colocation relationships between the SSBs in the first SSB set, are not quasi-colocated. When the UE receives the second indication information indicating that SSBs, which are quasi-colocated based on the predefined quasi-colocation relationships between the SSBs in the first SSB set, are not quasi-colocated, the UE still determines the quasi-colocation relationship between the SSBs in the second SSB set according to the predefined quasi-colocation relationship between the SSBs in first SSB set.

For example, according to the predefined correspondence between the SSBs in the first SSB set and the second index, the first SSB and the second SSB are quasi-colocated (respectively corresponding to a second index and values thereof are identical), and the second indication information indicates that the first SSB and the second SSB in the second SSB set are not quasi-colocated, hence, according to the predefined quasi-colocation relationships between the SSBs in the first SSB set, the UE still deems that the first SSB and the second SSB are quasi-colocated.

For the convenience of description, it is assumed below that fourth indices denote spatial domain information (such as beam identifiers) of the SSBs in the second SSB set, or in other words, denotes the quasi-colocation relationships between the SSBs in the second SSB set, SSBs having identical values of the fourth index being quasi-colocated.

Furthermore, as shown in the example in FIG. 10, in a case where the SSBs in the first SSB set correspond to two or more second indices, one of the second indices may denote the spatial domain information of the SSBs in the second SSB set, or in other words, denote the quasi-colocation relationships between the SSBs in the second SSB set, SSBs having identical values of the second index being quasi-colocated.

Figure 11:
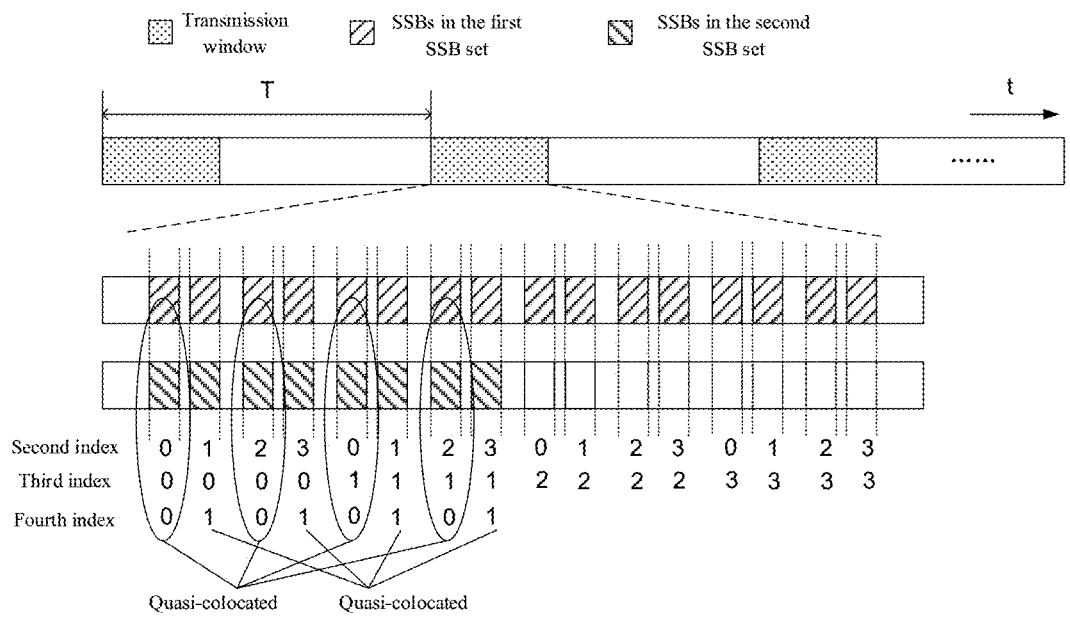
FIG. 11 is another schematic diagram of indicating a quasi-colocation relationship between SSBs in the second SSB set of Embodiment 1 of this disclosure.

FIG. 11 is another schematic diagram of indicating the quasi-colocation relationship between SSBs in the second SSB set of Embodiment 1 of this disclosure. As shown in FIG. 11, the second index and the third index are identical to those shown in FIG. 8. Fourth indices to which the SSBs in the second SSB set correspond are 01010101 in succession, and the quasi-colocation relationships between the SSBs in the second SSB set are as shown in FIG. 11, and SSBs having identical values of the fourth index are quasi-colocated.

In this embodiment, when at least one SSB in the second SSB set corresponds to two or more second indices (or fourth indices), the UE needs to uniquely determine the QCL relationships between the SSBs in the second SSB set received by it according to values of second indices (or fourth indices) indicated by SSBs received by it.

In this embodiment, the first SSB set is predefined.

For example, an SSB in the first SSB set may correspond to a value of a first index, or may correspond to a value of at least one second index, or may also correspond to a value of a first index and a value of at least one second index.

In this embodiment, the SSBs in the first SSB set correspond to a value of a first index. The first index indicates a time-domain position of the SSB in the first SSB set in the transmission window, and the SSBs in the first SSB set correspond to values of the first index one by one.

The UE may determine the time-domain positions of the SSBs in the first SSB set according to the first index, so as to obtain frame timing.

In this embodiment, the SSBs in the first SSB set may also correspond to at least one second index. The second index indicates the quasi-colocation relationships between the SSBs in the first SSB set, and the first SSB set includes two SSBs corresponding to identical second index values.

In this embodiment, the SSBs in the first SSB set may correspond to one second index, or may correspond to multiple second indices.

The UE may determine the spatial information between the SSBs in the first SSB set according to the second index, i.e. the quasi-colocation relationships.

In this embodiment, the first indices and/or the second indices of the SSBs in the first SSB set may be indicated via, for example, signals and/or channels in the SSBs.

Figure 12:
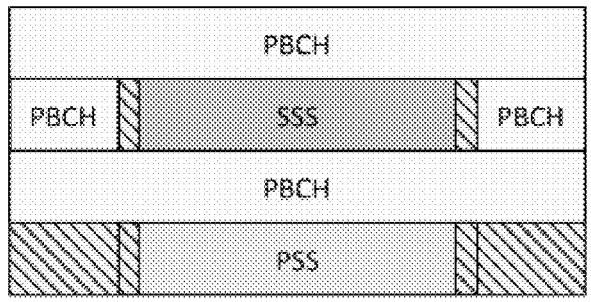
FIG. 12 is a schematic diagram of a structure of an SSB of Embodiment 1 of this disclosure.

FIG. 12 is a schematic diagram of a structure of an SSB of Embodiment 1 of this disclosure. As shown in FIG. 12, an SSB contains a PBCH, an SSS, a PBCH, and a PSS.

In order to support the UE to determine the frame timing according to an SSB after receiving an SSB, a time-domain position of the SSB in a corresponding transmission window needs to be indicated by the signal and/or channel in the SSB (such as at least one of a PSS, an SSS, a PBCH and a PBCH DMRS).

For example, the time-domain position of the SSB in the corresponding transmission window is characterized by the first index (values of the first index correspond to the SSBs in the first SSB set one by one), and values of the first index to which the SSB corresponds is indicated by the signal and/or channel in the SSB, so as to indicate the time-domain position of the SSB in the corresponding transmission window.

In particular, for example, the DMRS in the SSB indicates a part of information of the first index value, and a part of payload in the PBCH in the SSB indicates another part of the information of the first index value, which are, for example, as shown in the following table.

|  | DMRS | A part of payload in the PBCH |
|---|---|---|
| Indication information for values of the first index | N1 LSBs of the indication information, N1 being, for example, 3 | N2 MSBs of the indication information, N2 being, for example, 3 |

For another example, the time-domain position of the SSB in the corresponding transmission window is characterized by the second index and other information (the third index or a timing offset), and the second index to which the SSB corresponds and other information are indicated by the signal and/or channel in the SSB, so as to indicate the time-domain position of the SSB in the corresponding transmission window.

In particular, for example, the value of the second index is indicated by the DMRS in the SSB, and other information is indicated by a part of the payload in the PBCH in the SSB. In addition, when the SSBs in the first SSB set correspond to one first index value, a corresponding second index may also be determined via the indicated first index and a correspondence between the first index and the second index; when the SSBs in an SSB set correspond to at least one second index, a corresponding first index may also be determined via the indicated second index and a correspondence between the second index and the first index.

In this embodiment, the first index is, for example, an SSB time index or an SSB index.

In this embodiment, the second index is, for example, an SSB beam index or an SSB index or a DRS index (DRS index) or a timing offset (timing offset).

Figure 13:
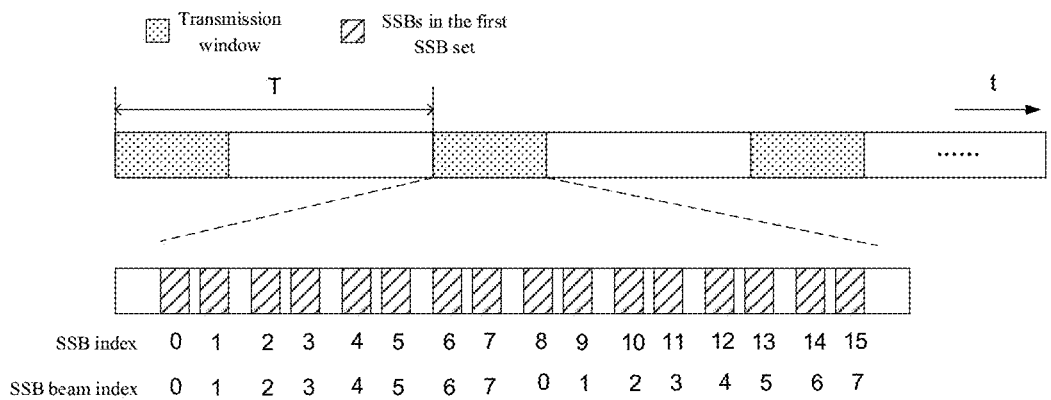
FIG. 13 is a schematic diagram of the first SSB set of Embodiment 1 of this disclosure.

FIG. 13 is a schematic diagram of the first SSB set of Embodiment 1 of this disclosure. As shown in FIG. 13, the first index is an SSB index, the second index is an SSB beam index, and the first SSB set contains 16 SSBs, the 16 SSBs corresponding to an SSB index and an SSB beam index respectively; wherein SSBs with identical second index values are nonadjacent SSBs.

Figure 14:
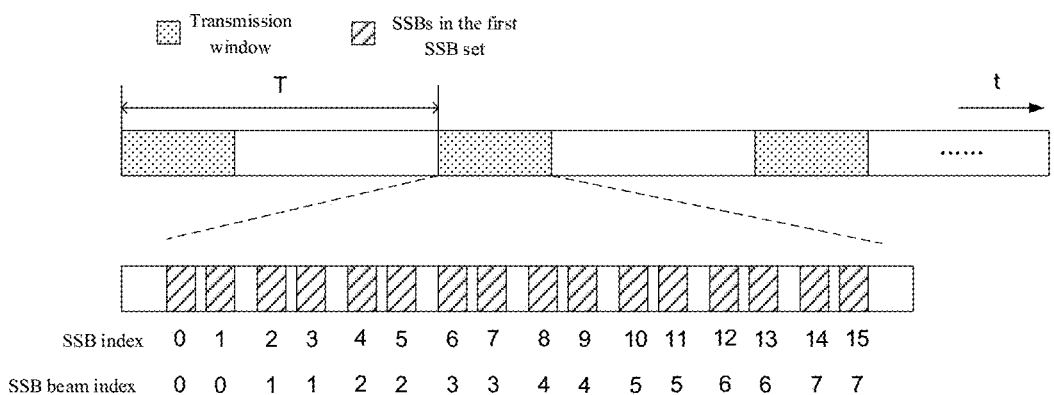
FIG. 14 is another schematic diagram of the first SSB set of Embodiment 1 of this disclosure.

FIG. 14 is another schematic diagram of the first SSB set of Embodiment 1 of this disclosure. As shown in FIG. 14, the first index is an SSB index, the second index is an SSB beam index, and the first SSB set contains 16 SSBs, the 16 SSBs corresponding to an SSB index and an SSB beam index respectively; wherein SSBs with identical second index values are adjacent SSBs.

Figure 15:
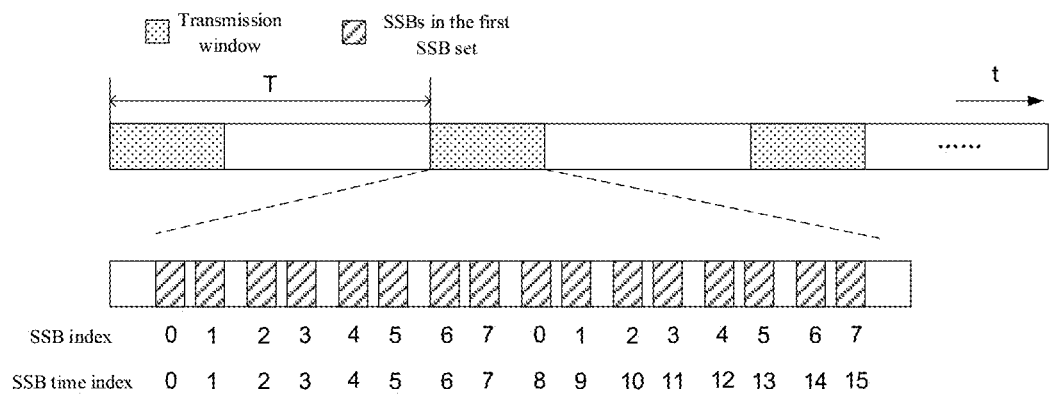
FIG. 15 is a further schematic diagram of the first SSB set of Embodiment 1 of this disclosure.

FIG. 15 is a further schematic diagram of the first SSB set of Embodiment 1 of this disclosure. As shown in FIG. 15, the first index is an SSB time index, the second index is an SSB index, and the first SSB set contains 16 SSBs, the 16 SSBs corresponding to an SSB time index and an SSB index respectively; wherein SSBs with identical second index values are nonadjacent SSBs.

Figure 16:
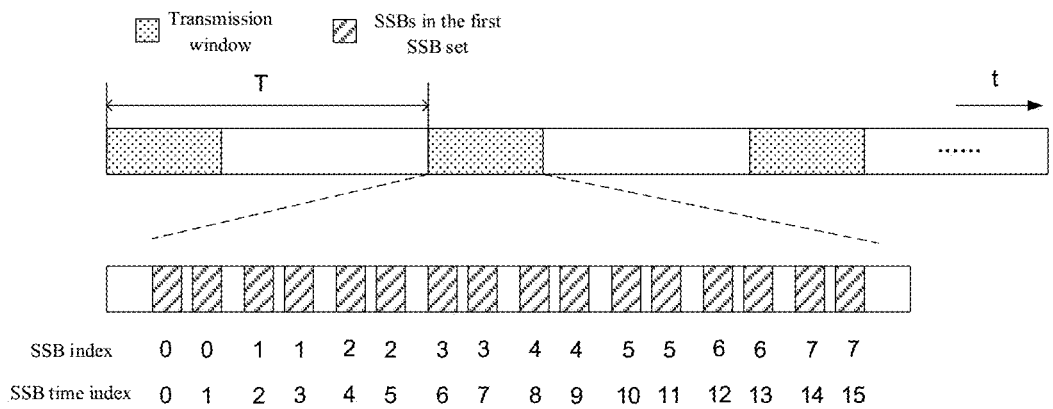
FIG. 16 is still another schematic diagram of the first SSB set of Embodiment 1 of this disclosure.

FIG. 16 is still another schematic diagram of the first SSB set of Embodiment 1 of this disclosure. As shown in FIG. 16, the first index is an SSB time index, the second index is an SSB index, and the first SSB set contains 16 SSBs, the 16 SSBs corresponding to an SSB time index and an SSB index respectively; wherein SSBs with identical second index values are adjacent SSBs.

Figure 17:
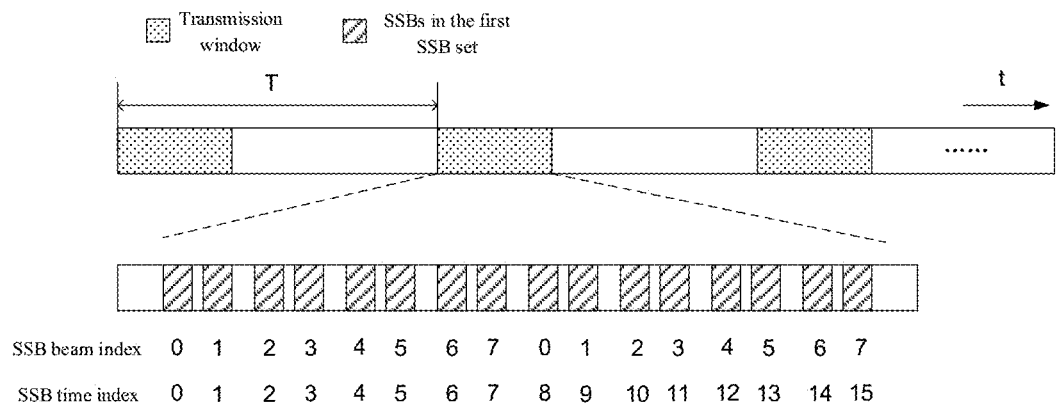
FIG. 17 is yet another schematic diagram of the first SSB set of Embodiment 1 of this disclosure.

FIG. 17 is yet another schematic diagram of the first SSB set of Embodiment 1 of this disclosure. As shown in FIG. 17, the first index is an SSB time index, the second index is an SSB beam index, and the first SSB set contains 16 SSBs, the 16 SSBs corresponding to an SSB index and an SSB beam index respectively; wherein SSBs with identical second index values are nonadjacent SSBs.

Figure 18:
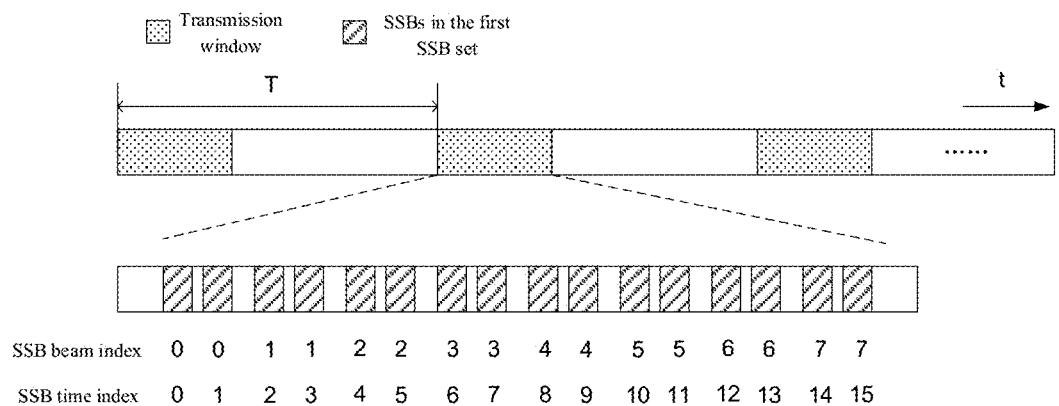
FIG. 18 is a yet further schematic diagram of the first SSB set of Embodiment 1 of this disclosure.

FIG. 18 is a yet further schematic diagram of the first SSB set of Embodiment 1 of this disclosure. As shown in FIG. 18, the first index is an SSB time index, the second index is an SSB beam index, and the first SSB set contains 16 SSBs, the 16 SSBs corresponding to an SSB index and an SSB beam index respectively; wherein SSBs with identical second index values are adjacent SSBs.

In this embodiment, for example, in the unlicensed band, the SSBs may also be transmitted as a part of DRSs, in which case the DRSs correspond to the SSBs one by one.

For example, in this case, the transmission window may be a DRS transmission window, and the second index may be a DRS index.

That is to say, one DRS contains one SSB, and furthermore, one DRS may also contain a PDCCH and/or PDSCH to which at least one pieces of remaining minimum system information (RMSI) or SIB1 corresponds. At this moment, the SSBs in the DRS correspond to the RMSI one by one.

Figure 25:
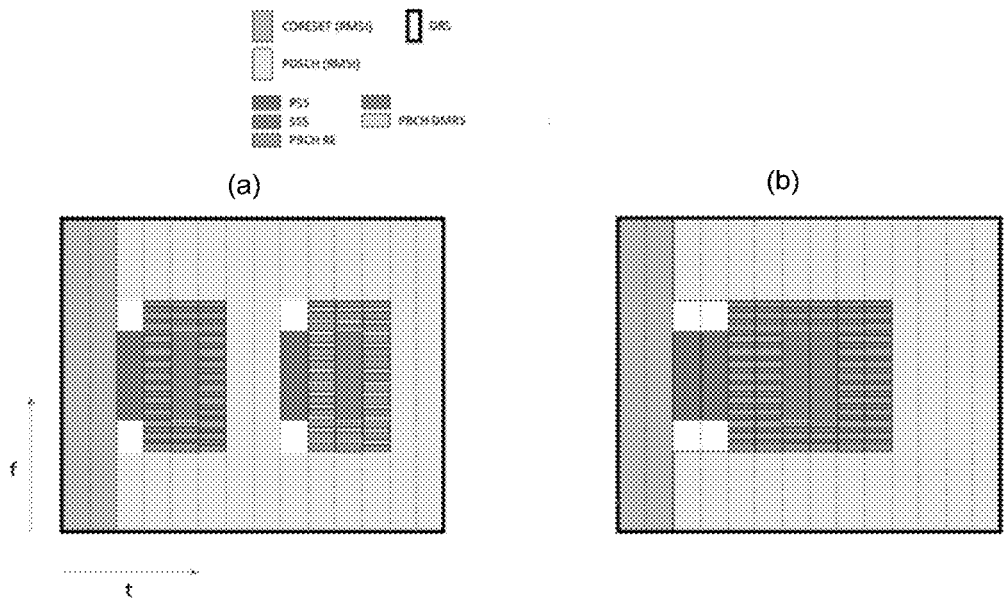
FIG. 25 is a schematic diagram of a structure of the DRS of Embodiment 1 of this disclosure.

FIG. 25 is a schematic diagram of a structure of the DRS of Embodiment 1 of this disclosure. As shown in (a) in FIG. 25, the DRS contains two repeated SSBs; and as shown in (b) in FIG. 25, the DRS contains an extended SSB.

FIG. 25 is only a schematic diagram of the structure of the DRS, and other structures may also be used for the DRS.

When the SSBs are included in the DRS and transmitted, the above method described for the SSBs is also applicable to the DRS, which shall not be described herein any further.

It can be seen from the above embodiment that the first SSB set corresponding to the transmission window and the second SSB set taken as a subset of the first SSB set are provided, and at least one SSB in the second SSB set is transmitted in the transmission window, which may be adapted to cell coverage of different situations, and improve flexibility of resource scheduling.

Embodiment 2

The embodiment of this disclosure provides a data transmission method, applicable to a user equipment. This method corresponds to the data transmission method applicable to a network equipment side in Embodiment 1, with identical contents being not going to be described herein any further.

Figure 19:
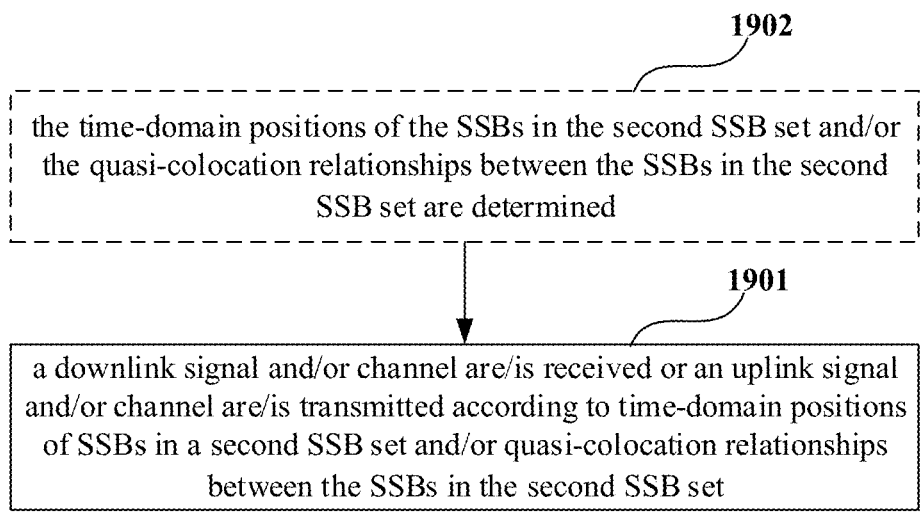
FIG. 19 is a schematic diagram of the data transmission method of Embodiment 2 of this disclosure.

FIG. 19 is a schematic diagram of the data transmission method of Embodiment 2 of this disclosure. As shown in FIG. 19, the method includes:

Step 1901: a downlink signal and/or channel are/is received or an uplink signal and/or channel are/is transmitted according to time-domain positions of SSBs in a second SSB set and/or quasi-colocation relationships between the SSBs in the second SSB set, the second SSB set being a subset of a first SSB set, SSBs in the first SSB set corresponding to different time-domain positions in a transmission window.

Thus, the UE may receive the downlink signal and/or channel or transmit the uplink signal and/or channel according to the time-domain positions and/or quasi-colocation relationships of the SSBs in the second SSB set, thereby improving the flexibility and utilization of resource utilization rate.

In this embodiment, the first SSB set may be predefined.

In this embodiment, the second SSB set may be predefined or preconfigured.

In this embodiment, contents of the second SSB set and the content of the first SSB set and the indication methods thereof may be identical to those described in Embodiment 1, which shall not be described herein any further.

In this embodiment, as shown in FIG. 19, the method may further include:

Step 1902: the time-domain positions of the SSBs in the second SSB set and/or the quasi-colocation relationships between the SSBs in the second SSB set are determined.

For example, according to the time-domain positions of the SSBs and/or the quasi-colocation relationships between the SSBs in the first SSB set, the time-domain positions of the SSBs and/or the quasi-colocation relationships between the SSBs in the second SSB set are determined.

In this embodiment, the time-domain positions of the SSBs and/or the quasi-colocation relationship between the SSBs in the first SSB set are predefined, and manners of predefinition are identical to those described in Embodiment 1, which shall not be described herein any further.

For example, when the first indication information and/or the second indication information is/are received, the time-domain positions and/or the quasi-colocation positions of the SSBs in the second SSB set are also determined according to the received first indication information and/or second indication information. The first indication information indicates the second SSB set, and the second indication information indicates the quasi-colocation relationships between SSBs in the second SSB set.

In this embodiment, the contents of the first indication information and/or the second indication information and a method for transmitting the information by the network equipment are identical to those described in Embodiment 1, which shall not be described herein any further.

For example, the quasi-colocation relationships between the SSBs in the second SSB set are determined according to the second index and/or the received second indication information, and the second index indicates the quasi-colocation relationships between the SSBs in the first SSB set.

For example, as shown in FIG. 11, the quasi-colocation relationships between the SSBs in the second SSB set are determined according to the second index and a fourth index in the second indication information.

In addition, the quasi-colocation relationships between the SSBs in the second SSB set may also be determined according to the fourth index only.

In step 1901, the downlink signal and/or channel is/are received or the uplink signal and/or channel is/are transmitted according to the time-domain positions and/or quasi-colocation relationships of the SSBs in the second SSB set.

In this embodiment, the downlink signal and/or channel is/are, for example, an SSB/DRS, or a downlink signal and/or channel other than an SSB/DRS, the downlink signal and/or channel other than the SSB/DRS being, for example, at least one of a physical downlink control channel (PDCCH), a physical downlink shared channel (PDSCH), and a downlink reference signal (such as a CSI-RS).

In this embodiment, the uplink signal and/or channel is/are, for example, at least one of a physical random access channel (PRACH), an uplink reference signal (such as a sounding reference signal (SRS)), a physical uplink control channel (PUCCH) and a physical uplink shared channel PUSCH).

In step 1901, at least one of the following processing may be performed according to the time-domain positions and/or quasi-colocation relationships of the SSBs in the second SSB set: monitoring a physical downlink control channel; receiving a physical downlink data channel; transmitting an uplink signal and/or channel; and performing radio link monitoring (RLM).

For example, for a case of monitoring a PDCCH or receiving a PDSCH according to the time-domain positions and/or quasi-colocation relationships of the SSB in the second SSB set, a QCL relationship between the PDCCH and the SSBs in the second SSB set may be learnt according to the time-domain positions of the SSBs and/or the QCL relationships between the SSBs in the second SSB set, and QCL relationships between the SSBs in the second SSB set and at least one of the PDCCH and the PDSCH may also be determined according to the second index and/or the received second indication information, so as to monitor the PDCCH or receive the PDSCH.

For example, in the case of monitoring the PDCCH, when a DMRS antenna port of the PDCCH and SSBs in the second SSB set are quasi-colocated, the UE determines the SSBs in the second SSB set quasi-colocated with the DMRS antenna port of the PDCCH according to the second index and/or the fourth index, thereby receiving the PDCCH. For example, a CORESET containing the PDCCH is configured with a transmission configuration indication (TCI) state, a TCI state ID corresponding to the TCI state corresponds to a second index and/or a fourth index, hence, SSBs in the second SSB set quasi-colocated with the DMRS antenna port of the PDCCH are SSBs in the second SSB set corresponding to the second index and/or the fourth index.

For another example, in a case of monitoring the PDCCH corresponding to system information (SI), the UE learns a correspondence between a PDCCH monitoring occasion corresponding to the system information and the SSBs in the second SSB set according to the time-domain positions and/or QCL relationships of the SSBs in the second SSB set, so as to monitor the PDCCH corresponding to the system information. For example, PDCCH monitoring occasions to which the quasi-colocated SSBs in the second SSB set correspond are identical. For example, the second SSB set includes the first SSB and the second SSB, and the first SSB and the second SSB are quasi-colocated, hence, PDCCH monitoring occasions to which the first SSB and the second SSB correspond are identical.

Following is a specific example of the correspondence between the PDCCH monitoring occasion corresponding to the SI and the SSBs in the second SSB set.

For example, an [x*N+K]-th PDCCH monitoring occasion in an SI-window corresponding to the SI corresponds to a K-th group of quasi-colocated SSBs in the second SSB set; where x=0, 1, ... X−1, K=1, 2, ... N, N is the number of groups of quasi-colocated SSBs in the second SSB set, and X='CEIL (the number of PDCCH monitoring occasion(s) corresponding to the system information in the SI-window/N').

Figure 26:
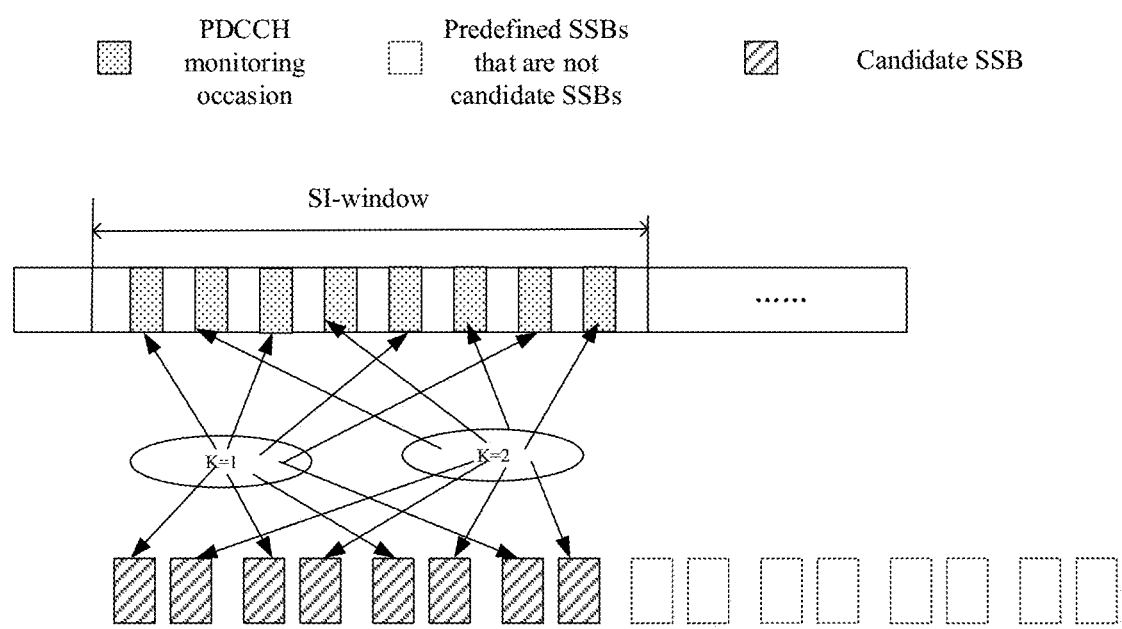
FIG. 26 is a schematic diagram of a correspondence between PDCCH monitoring occasions corresponding to SI and SSBs in the second SSB set of Embodiment 2 of this disclosure.

FIG. 26 is a schematic diagram of a correspondence between PDCCH monitoring occasions corresponding to the SI and SSBs in the second SSB set of Embodiment 2 of this disclosure.

As shown in FIG. 26, it is assumed that N=2 and the number of PDCCH monitoring occasions(s) corresponding to system information in the SI-window is 8, and the correspondence between the PDCCH monitoring occasions(s) in the SI-window and the SSBs in the second SSB set is as shown in FIG. 26.

For example, in the case of receiving the PDSCH, when the PDCCH does not indicate the TCI status, the UE assumes that the SSBs in the second SSB set quasi-colocated with the DRMS antenna port of the PDSCH are identical to PDCCHs associated with the PDSCH; or, a PDCCH associated with the PDSCH indicates the TCI state of the PDSCH (for example, the DCI includes the TCI state ID), the TCI state ID corresponding to the TCI state corresponds to a second index and/or a fourth index, and what are quasi-colocated with the DMRS antenna port of the PDSCH are SSBs in the second SSB set corresponding to the second index and/or the fourth index.

For example, in the case of transmitting a PRACH, the UE determines an association relationship between the SSBs and the PRACH according to the quasi-colocation relationships between the SSBs in the second SSB set, thereby selecting PRACH resources to transmit message 1 (msg.1).

It can be seen from the above embodiment that the UE may receive the downlink signal and/or channel or transmit the uplink signal and/or channel according to the time-domain positions and/or quasi-colocation relationships of the SSBs in the second SSB set, thereby improving the flexibility and utilization of resource utilization rate.

Embodiment 3

The embodiment of this disclosure provides a data transmission method, applicable to a network equipment side and a user equipment side. This method corresponds to embodiments 1 and 2, and reference may be made to what are described in embodiments 1 and 2, with identical contents being not going to be described herein any further.

Figure 20:
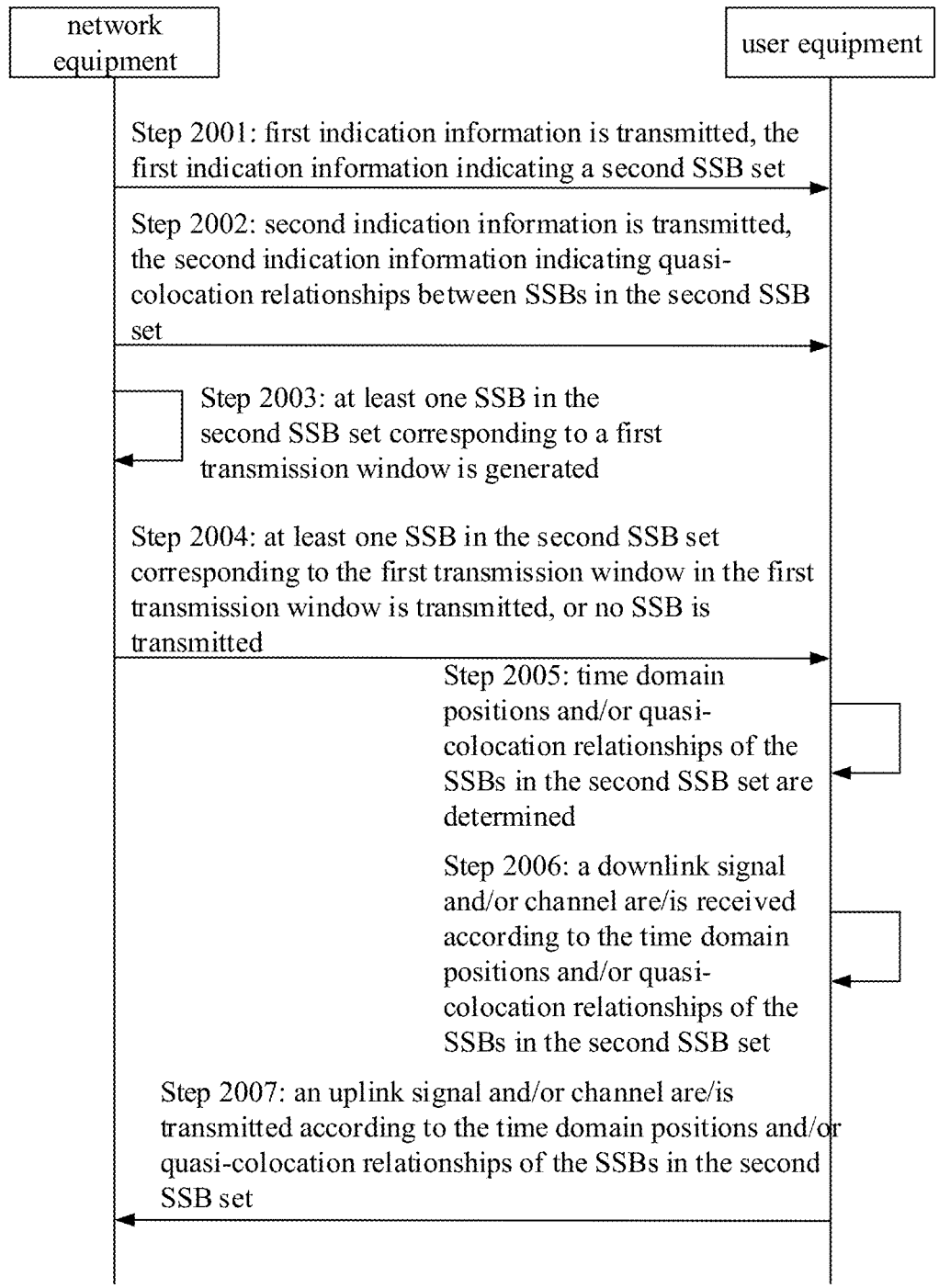
FIG. 20 is a schematic diagram of the data transmission method of Embodiment 3 of this disclosure.

FIG. 20 is a schematic diagram of the data transmission method of Embodiment 3 of this disclosure. As shown in FIG. 20, the method includes:

Step 2001: first indication information is transmitted, the first indication information indicating a second SSB set;

Step 2002: second indication information is transmitted, the second indication information indicating quasi-colocation relationships between SSBs in the second SSB set;

Step 2003: at least one SSB in the second SSB set corresponding to a first transmission window is generated;

Step 2004: at least one SSB in the second SSB set corresponding to the first transmission window in the first transmission window is transmitted, or no SSB is transmitted;

Step 2005: time domain positions and/or quasi-colocation relationships of the SSBs in the second SSB set are determined;

Step 2006: a downlink signal and/or channel are/is received according to the time domain positions and/or quasi-colocation relationships of the SSBs in the second SSB set; and/or Step 2007: an uplink signal and/or channel are/is transmitted according to the time domain positions and/or quasi-colocation relationships of the SSBs in the second SSB set.

In this embodiment, the second SSB set is a subset of the first SSB set, and the SSBs in the first SSB set correspond to different time domain positions of the first transmission window.

In this embodiment, steps 2001, 2002, 2003 and 2005 are not necessary.

In addition, a timing relationship between steps 2001-2004 is not limited.

In this embodiment, at least one of step 2006 and step 2007 may be performed.

In this embodiment, particular implementations of steps 2001-2007 are identical to those described in Embodiment 1 and Embodiment 2, and shall not be described herein any further.

It can be seen from the above embodiment that the first SSB set corresponding to the transmission window and the second SSB set taken as a subset of the first SSB set are provided, and at least one SSB in the second SSB set is transmitted in the transmission window, which may be adapted to cell coverage of different situations, and improve flexibility of resource scheduling.

Embodiment 4

The embodiment of this disclosure provides a data transmission apparatus, configured at a network equipment side.

As a principle of the apparatus for solving problems is similar to that of the method in Embodiment 1, reference may be made to the implementation of the method in Embodiment 1 for implementation of this apparatus, with identical contents being going to be described herein any further.

Figure 21:
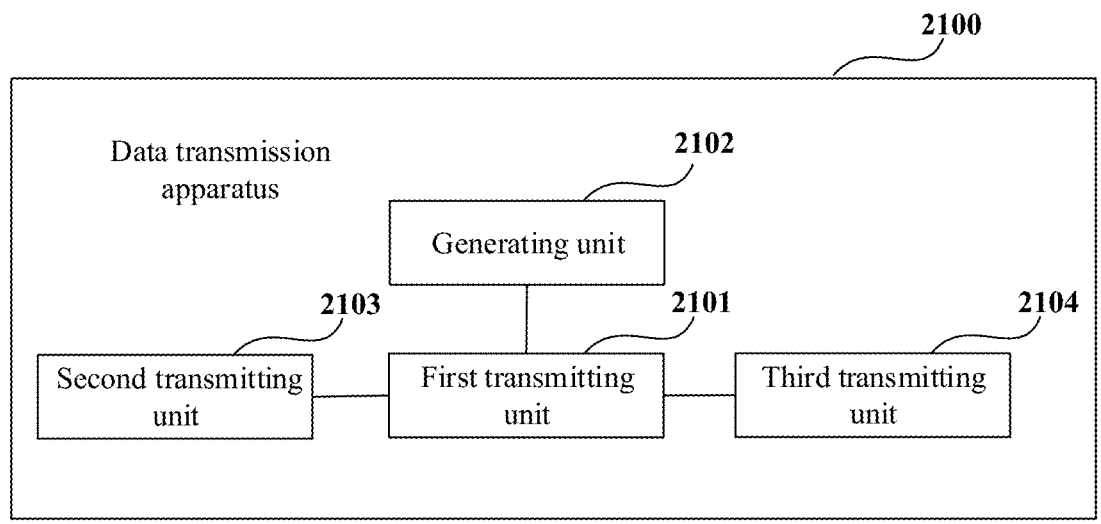
FIG. 21 is a schematic diagram of the data transmission apparatus of Embodiment 4 of this disclosure.

FIG. 21 is a schematic diagram of the data transmission apparatus of Embodiment 4 of this disclosure. As shown in FIG. 21, an apparatus 2100 includes:

a first transmitting unit 2101 configured to, in a first transmission window, transmit at least one SSB in a second SSB set corresponding to the first transmission window, or not to transmit an SSB;

the second SSB set is a subset of a first SSB set, SSBs in the first SSB set corresponding to different time-domain positions in the first transmission window.

In this embodiment, at least one SSB in the second SSB set is not transmitted in the first transmission window.

In this embodiment, two SSBs in the second SSB set or the first SSB set are quasi-colocated.

In this embodiment, time-domain positions of two SSBs in the second SSB set or the first SSB set are overlapped.

As shown in FIG. 21, the apparatus may further include:

a generating unit 2102 configured to generate at least one SSB in the second SSB set corresponding to the first transmission window.

In this embodiment, in the first transmission window, according to a channel state, the first transmitting unit 2101 transmits the at least one SSB in the second SSB set corresponding to the first transmission window, or does not transmit an SSB.

As shown in FIG. 21, the apparatus may further include:

a second transmitting unit 2103 configured to transmit first indication information, the first indication information indicating the second SSB set.

In this embodiment, the first indication information indicates the second SSB set based on time-domain positions of SSBs in the first SSB set and/or quasi-colocation relationships between SSBs in the first SSB set.

In this embodiment, the first indication information indicates the second SSB set based on corresponding relationships between the SSBs in the first SSB set and a first index, the first index being representative of the time-domain positions of the SSBs in the first SSB set in the transmission window, and the SSBs in the first SSB set corresponding to values of the first index one by one.

In this embodiment, the first indication information indicates the second SSB set based on corresponding relationships between the SSBs in the first SSB set and a second index, the second index being representative of quasi-colocation relationships between the SSBs in the first SSB set, and the first SSB set including two SSBs corresponding to identical values of the second index, and the two SSBs corresponding to identical values of the second index being quasi-colocated.

In this embodiment, the first indication information further indicates the second SSB set based on corresponding relationships between the SSBs in the first SSB set and a third index, the third index being representative of sequence numbers or time-domain positions of SSBs in a group consisting of the SSBs in the first SSB set corresponding to identical values of the second index in the group, and the SSBs in the group corresponding to values of the third index one by one.

In this embodiment, the first indication information is transmitted via RRC signaling, and the first indication information corresponds to a first parameter or a second parameter, the first parameter being an existing parameter, and the second parameter being a new parameter.

As shown in FIG. 21, the apparatus may further include:

a third transmitting unit 2104 configured to transmit second indication information, the second indication information indicating quasi-colocation relationships between SSBs in the second SSB set.

In this embodiment, the second indication information indicates that a first SSB and a second SSB in the second SSB set are quasi-colocated, values of the second index to which the first SSB and the second SSB correspond being different.

In this embodiment, reference may be made to what are described in Embodiment 1 for implementations of the functions of the above units, with identical contents being not going to be described herein any further.

It can be seen from the above embodiment that the first SSB set corresponding to the transmission window and the second SSB set taken as a subset of the first SSB set are provided, and at least one SSB in the second SSB set is transmitted in the transmission window, which may be adapted to cell coverage of different situations, and improve flexibility of resource scheduling.

Embodiment 5

The embodiment of this disclosure provides a data transmission apparatus, configured at a user equipment side. As a principle of the apparatus for solving problems is similar to that of the method in Embodiment 2, reference may be made to the implementation of the method in Embodiment 2 for implementation of this apparatus, with identical contents being going to be described herein any further.

Figure 22:
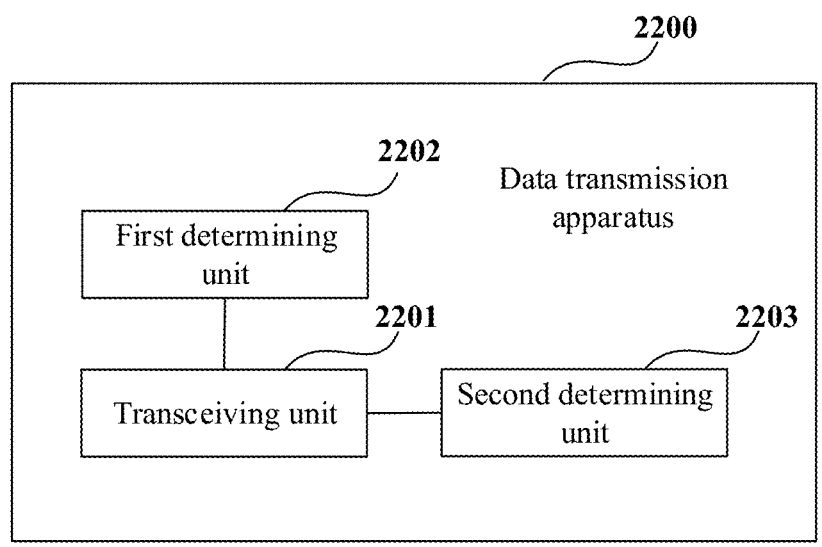
FIG. 22 is a schematic diagram of the data transmission apparatus of Embodiment 5 of this disclosure.

FIG. 22 is a schematic diagram of the data transmission apparatus of Embodiment 5 of this disclosure. As shown in FIG. 22, an apparatus 2200 includes:

a transceiving unit 2201 configured to receive a downlink signal and/or channel or transmit an uplink signal and/or channel according to time-domain positions of SSBs in a second SSB set and/or quasi-colocation relationships between the SSBs in the second SSB set, the second SSB set being a subset of a first SSB set, SSBs in the first SSB set corresponding to different time-domain positions in a transmission window.

As shown in FIG. 22, the apparatus may further include:

a first determining unit 2202 configured to determine the time-domain positions of the SSBs in the second SSB set and/or the quasi-colocation relationships between the SSBs in the second SSB set.

In this embodiment, the first determining unit 2202 determines the time-domain positions of the SSBs in the second SSB set and/or the quasi-colocation relationships between the SSBs in the second SSB set according to received first indication information and/or second indication information, the first indication information indicating the second SSB set, and second indication information indicating the quasi-colocation relationships between the SSBs in the second SSB set.

In this embodiment, the first determining unit 2202 determines the quasi-colocation relationships between the SSBs in the second SSB set according to a second index and/or the received second indication information, the second index being indicative of the quasi-colocation relationships between the SSBs in the first SSB set.

In this embodiment, the transceiving unit 2201 may perform at least one of the following processing according to the time-domain positions of the SSBs in the second SSB set and/or the quasi-colocation relationships between the SSBs in the second SSB set:

monitoring a physical downlink control channel;
receiving a physical downlink data channel;
transmitting an uplink signal and/or channel; and
performing radio link monitoring.

As shown in FIG. 22, the apparatus may further include:
a second determining unit 2203 configured to determine quasi-colocation relationships between the SSBs in the second SSB set and at least one of the physical downlink control channel and the physical downlink data channel according to the second index and/or the received second indication information.

It can be seen from the above embodiment that the UE may receive the downlink signal and/or channel or transmit the uplink signal and/or channel according to the time-domain positions and/or quasi-colocation relationships of the SSBs in the second SSB set, thereby improving the flexibility and utilization of resource utilization rate.

Embodiment 6

The embodiment of this disclosure provides a network equipment, including the data transmission apparatus as described in Embodiment 4.

Figure 23:
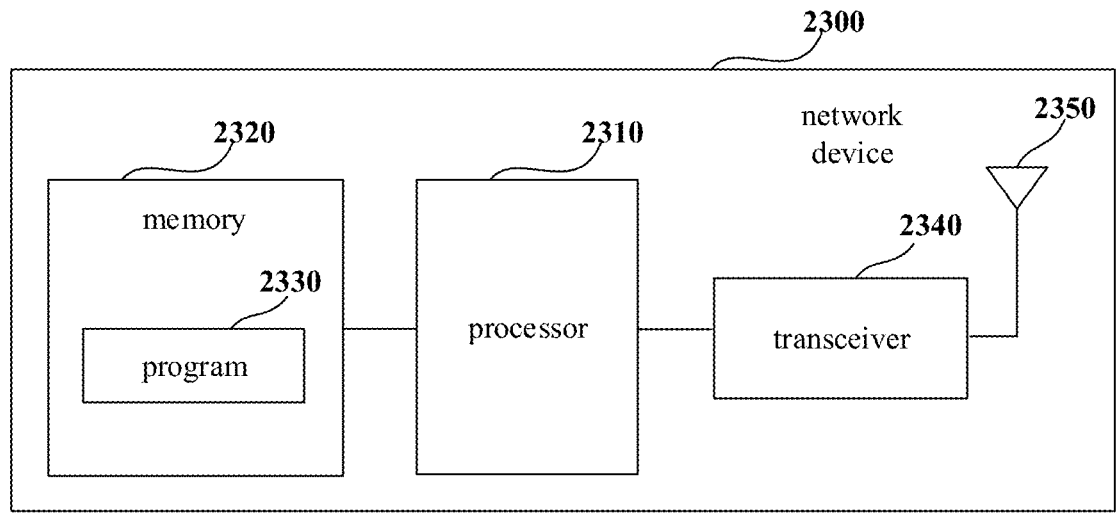
FIG. 23 is a schematic diagram of a structure of the network equipment of Embodiment 6 of this disclosure.

FIG. 23 is a schematic diagram of a structure of the network equipment of the embodiment of this disclosure. As shown in FIG. 23, a network equipment 2300 may include a processor 2310 and a memory 2320, the memory 2320 being coupled to the processor 2310. For example, the memory 2320 may store various data, and furthermore, it may store a program 2330 for data processing, and execute the program 2330 under control of the processor 2310, so as to receive various data transmitted by a user equipment and transmit various data to the user equipment.

In one implementation, the functions of the data transmission apparatus may be integrated into the processor 2310. For example, the processor 2310 may be configured to: in a first transmission window, transmit at least one SSB in a second SSB set corresponding to the first transmission window, or not to transmit an SSB; wherein the second SSB set is a subset of a first SSB set, SSBs in the first SSB set corresponding to different time-domain positions in the first transmission window.

For example, according to a channel state, the at least one SSB in the second SSB set corresponding to the first transmission window is transmitted in the first transmission window, or no SSB is transmitted.

For example, the processor 2310 may further be configured to: generate at least one SSB in the second SSB set corresponding to the first transmission window.

For example, the processor 2310 may further be configured to: transmit first indication information, the first indication information indicating the second SSB set.

For example, the processor 2310 may further be configured to: transmit second indication information, the second indication information indicating quasi-colocation relationships between SSBs in the second SSB set.

In another implementation, the data transmission apparatus and the processor 2310 may be configured separately; for example, the data transmission apparatus may be configured as a chip connected to the processor 2310, and the functions of the data transmission apparatus are executed under control of the processor 2310.

Furthermore, as shown in FIG. 23, the network equipment 2300 may include a transceiver 2340, and an antenna 2350, etc. Functions of the above components are similar to those in the related art, and shall not be described herein any further. It should be noted that the network equipment 2300 does not necessarily include all the parts shown in FIG. 23, and furthermore, the network equipment 2300 may include parts not shown in FIG. 23, and the related art may be referred to.

It can be seen from the above embodiment that the first SSB set corresponding to the transmission window and the second SSB set taken as a subset of the first SSB set are provided, and at least one SSB in the second SSB set is transmitted in the transmission window, which may be adapted to cell coverage of different situations, and improve flexibility of resource scheduling.

Embodiment 7

The embodiment of this disclosure provides a user equipment, including the data transmission apparatus as described in Embodiment 5.

Figure 24:
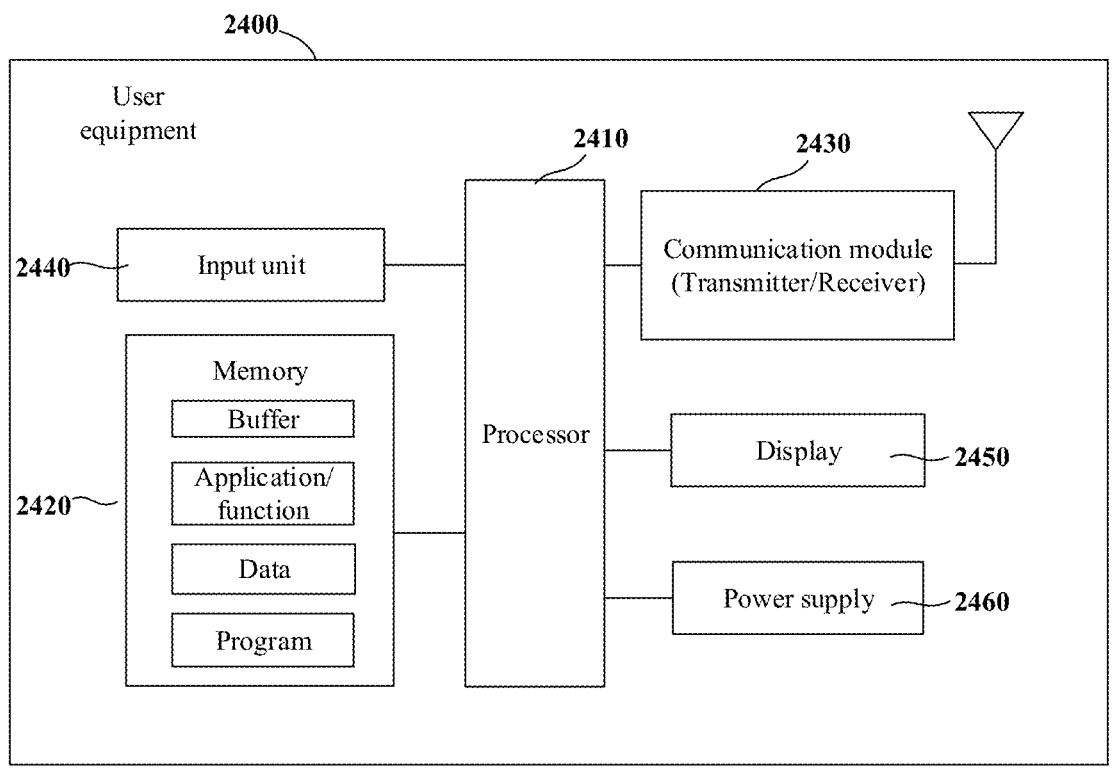
FIG. 24 is a block diagram of a systematic structure of the user equipment of Embodiment 7 of this disclosure.

FIG. 24 is a block diagram of a systematic structure of the user equipment of Embodiment 7 of this disclosure. As shown in FIG. 24, a user equipment 2400 may include a processor 2410 and a memory 2420, the memory 2420 being coupled to the processor 2410. It should be noted that this figure is illustrative only, and other types of structures may also be used, so as to supplement or replace this structure and achieve a telecommunications function or other functions.

In one implementation, the functions of the data transmission apparatus may be integrated into the processor 2410. The processor 2410 may be configured to: receive a downlink signal and/or channel or transmit an uplink signal and/or channel according to time-domain positions of SSBs in a second SSB set and/or quasi-colocation relationships between the SSBs in the second SSB set, the second SSB set being a subset of a first SSB set, SSBs in the first SSB set corresponding to different time-domain positions in a transmission window.

In another implementation, the data transmission apparatus and the processor 2410 may be configured separately; for example, the data transmission apparatus may be configured as a chip connected to the processor 2410, and the functions of the data transmission apparatus are executed under control of the processor 2410.

As shown in FIG. 24, the user equipment 2400 may further include a communication module 2430, an input unit 2440, a display 2450, and a power supply 2460, etc. It should be noted that the user equipment 2400 does not necessarily include all the parts shown in FIG. 24. Furthermore, the user equipment 2400 may include parts not shown in FIG. 24, and the related art may be referred to.

As shown in FIG. 24, the processor 2410 is sometimes referred to as a controller or an operational control, which may include a microprocessor or other processor devices and/or logic devices. The processor 2410 receives input and controls operations of components of the user equipment 2400.

For example, the memory 2420 may be, for example, one or more of a buffer memory, a flash memory, a hard drive, a mobile medium, a volatile memory, a nonvolatile memory, or other suitable devices, which may store various data, etc., and furthermore, store programs executing related information. And the processor 2410 may execute programs stored in the memory 2420, so as to realize information storage or processing, etc. Functions of other parts are similar to those of the related art, which shall not be described herein any further. The parts of the user equipment 2400 may be realized by specific hardware, firmware, software, or any combination thereof, without departing from the scope of this disclosure.

It can be seen from the above embodiment that the UE may receive the downlink signal and/or channel or transmit the uplink signal and/or channel according to the time-domain positions and/or quasi-colocation relationships of the SSBs in the second SSB set, thereby improving the flexibility and utilization of resource utilization rate.

Embodiment 8

The embodiment of this disclosure provides a communication system, including the network equipment described in Embodiment 6 and/or the user equipment described in Embodiment 7.

For example, a structure of the communication system may be as shown in FIG. 1. As shown in FIG. 1, the communication system 100 includes a network equipment 101 and a user equipment 102. The user equipment 102 is identical to the user equipment described in Embodiment 7, and the network equipment 101 is identical to the network equipment described in Embodiment 6, with repeated contents being not going to be described herein any further.

It can be seen from the above embodiment that the first SSB set corresponding to the transmission window and the second SSB set taken as a subset of the first SSB set are provided, and at least one SSB in the second SSB set is transmitted in the transmission window, which may be adapted to cell coverage of different situations, and improve flexibility of resource scheduling.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIG. 21 may either correspond to software modules of procedures of a computer program, or correspond to hardware modules. Such software modules may respectively correspond to the steps shown in FIG. 2. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIG. 21 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIG. 21 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

According to various implementations disclosed in the embodiments of this disclosure, following supplements are further disclosed.

1. A data transmission method, applicable to a network equipment side, the method including:
   in a first transmission window, transmitting at least one SSB in a second SSB set corresponding to the first transmission window, or not transmitting an SSB;
   wherein the second SSB set is a subset of a first SSB set, SSBs in the first SSB set corresponding to different time-domain positions in the first transmission window.
2. The method according to supplement 1, wherein,
   at least one SSB in the second SSB set is not transmitted in the first transmission window.
3. The method according to supplement 1, wherein,
   the number of SSBs in the second SSB set is greater than or equal to a maximum number of transmitted SSBs to which the second SSB set corresponds.
4. The method according to supplement 1, wherein,
   two SSBs in the second SSB set or the first SSB set are quasi-colocated (QCLed).
5. The method according to supplement 1, wherein,
   time-domain positions of two SSBs in the second SSB set or the first SSB set are overlapped.
6. The method according to supplement 1, wherein the method further includes:
   generating at least one SSB in the second SSB set corresponding to the first transmission window.
7. The method according to supplement 1, wherein in the first transmission window, according to a channel state, the at least one SSB in the second SSB set corresponding to the first transmission window is transmitted, or no SSB is transmitted.
8. The method according to any one of supplements 1-7, wherein,
   the second SSB set is predefined or preconfigured.
9. The method according to any one of supplements 1-8, wherein,
   the first SSB set is predefined.

10. The method according to any one of supplements 1-9, wherein the method further includes:
transmitting first indication information, the first indication information indicating the second SSB set.

11. The method according to supplement 10, wherein, the first indication information indicates the second SSB set based on time-domain positions of SSBs in the first SSB set and/or quasi-colocation relationships between SSBs in the first SSB set.

12. The method according to supplement 10 or 11, wherein,
the first indication information indicates the second SSB set based on corresponding relationships between the SSBs in the first SSB set and a first index, the first index being representative of the time-domain positions of the SSBs in the first SSB set in the first transmission window, and the SSBs in the first SSB set corresponding to values of the first index one by one.

13. The method according to supplement 10 or 11, wherein,
the first indication information indicates the second SSB set based on corresponding relationships between the SSBs in the first SSB set and a second index, the second index being representative of quasi-colocation relationships between the SSBs in the first SSB set, and the first SSB set including two SSBs corresponding to identical values of the second index, and the two SSBs corresponding to identical values of the second index being quasi-colocated (QCLed).

14. The method according to supplement 13, wherein, the first indication information further indicates the second SSB set based on corresponding relationships between the SSBs in the first SSB set and a third index, the third index being representative of sequence numbers or time-domain positions of SSBs in a group consisting of the SSBs in the first SSB set corresponding to identical values of the second index in the group, and the SSBs in the group corresponding to values of the third index one by one.

15. The method according to supplement 10, wherein, the first indication information is transmitted via higher-layer signaling or a physical layer dynamic instruction.

16. The method according to supplement 15, wherein, the first indication information is transmitted via RRC signaling,
and the first indication information corresponds to a first parameter or a second parameter,
the first parameter being an existing parameter, and the second parameter being a new parameter.

17. The method according to any one of supplements 1-16, wherein the method further includes:
transmitting second indication information, the second indication information indicating quasi-colocation relationships between SSBs in the second SSB set.

18. The method according to supplement 17, wherein, the second indication information indicates that a first SSB and a second SSB are quasi-colocated (QCLed), values of the second index to which the first SSB and the second SSB correspond being different.

19. The method according to any one of supplements 1-18, wherein,
the SSBs in the first SSB set correspond to a first index.

20. The method according to any one of supplements 1-19, wherein,
the SSBs in the first SSB set correspond to at least one second index.

21. The method according to supplements 19 or 20, wherein,
values of the first index correspond to the SSBs in the first SSB set one by one, the first index being representative of time-domain positions of the SSBs in the first SSB set.

22. The method according to any one of supplements 19-21, wherein,
at least one value of the second index corresponds to at least two SSBs in the first SSB set, and the second index is representative of quasi-colocation relationships between the SSBs in the first SSB set.

23. The method according to any one of supplements 19-22, wherein,
the first index is determined by the indicated second index and a corresponding relationship between the first index and the second index; or
the second index is determined by the indicated first index and a corresponding relationship between the first index and the second index.

24. A data transmission method, applicable to a user equipment side, the method including:
receiving a downlink signal and/or channel or transmit an uplink signal and/or channel according to time-domain positions of SSBs in a second SSB set and/or quasi-colocation relationships between the SSBs in the second SSB set,
the second SSB set being a subset of a first SSB set, SSBs in the first SSB set corresponding to different time-domain positions in a transmission window.

25. The method according to supplement 24, wherein the method further includes:
determining the time-domain positions of the SSBs in the second SSB set and/or the quasi-colocation relationships between the SSBs in the second SSB set.

25A. The method according to supplement 25, wherein, the time-domain positions of the SSBs in the second SSB set and/or the quasi-colocation relationships between the SSBs in the second SSB set are determined according to the time-domain positions of SSBs in the first SSB set and/or quasi-colocation relationships between the SSBs in the first SSB set.

25B. The method according to supplement 25A, wherein, the time-domain positions of SSBs in the first SSB set and/or quasi-colocation relationships between the SSBs in the first SSB set are predefined.

26. The method according to supplement 25, wherein, the time-domain positions of the SSBs in the second SSB set and/or the quasi-colocation relationships between the SSBs in the second SSB set are determined according to received first indication information and/or second indication information,
the first indication information indicating the second SSB set, and second indication information indicating the quasi-colocation relationships between the SSBs in the second SSB set.

27. The method according to supplement 25 or 26, wherein,
the quasi-colocation relationships between the SSBs in the second SSB set are determined according to a second index and/or the received second indication information, the second index being indicative of the quasi-colocation relationships between the SSBs in the first SSB set.

28. The method according to any one of supplements 24-27, wherein,
the second SSB set is predefined or preconfigured.

29. The method according to any one of supplements 24-28, wherein,
the first SSB set is predefined.

30. The method according to supplement 24, wherein the receiving a downlink signal and/or channel or transmit an uplink signal and/or channel according to time-domain positions of SSBs in a second SSB set and/or quasi-colocation relationships between the SSBs in the second SSB set includes:
performing at least one of the following processing according to the time-domain positions of the SSBs in the second SSB set and/or the quasi-colocation relationships between the SSBs in the second SSB set:
monitoring a physical downlink control channel;
receiving a physical downlink data channel;
transmitting an uplink signal and/or channel; and
performing radio link monitoring.

31. The method according to supplement 30, wherein the method further includes:
determining quasi-colocation relationships between the SSBs in the second SSB set and at least one of the physical downlink control channel and the physical downlink data channel according to the second index and/or the received second indication information.

32. A data transmission apparatus, configured at a network equipment side, the apparatus including:
a first transmitting unit configured to, in a first transmission window, transmit at least one SSB in a second SSB set corresponding to the first transmission window, or not to transmit an SSB;
wherein the second SSB set is a subset of a first SSB set, SSBs in the first SSB set corresponding to different time-domain positions in the first transmission window.

33. The apparatus according to supplement 32, wherein, at least one SSB in the second SSB set is not transmitted in the first transmission window.

34. The apparatus according to supplement 32, wherein, the number of SSBs in the second SSB set is greater than or equal to a maximum number of transmitted SSBs to which the second SSB set corresponds.

35. The apparatus according to supplement 32, wherein, two SSBs in the second SSB set or the first SSB set are quasi-colocated (QCLed).

36. The apparatus according to supplement 32, wherein, time-domain positions of two SSBs in the second SSB set or the first SSB set are overlapped.

37. The apparatus according to supplement 32, wherein the apparatus further includes:
a generating unit configured to generate at least one SSB in the second SSB set corresponding to the first transmission window.

38. The apparatus according to supplement 32, wherein, in the first transmission window, according to a channel state, the first transmitting unit transmits the at least one SSB in the second SSB set corresponding to the first transmission window, or does not transmit an SSB.

39. The apparatus according to any one of supplements 32-38, wherein,
the second SSB set is predefined or preconfigured.

40. The apparatus according to any one of supplements 32-39, wherein,
the first SSB set is predefined.

41. The apparatus according to any one of supplements 32-40, wherein the apparatus further includes:
a second transmitting unit configured to transmit first indication information, the first indication information indicating the second SSB set.

42. The apparatus according to supplement 41, wherein, the first indication information indicates the second SSB set based on time-domain positions of SSBs in the first SSB set and/or quasi-colocation relationships between SSBs in the first SSB set.

43. The apparatus according to supplement 41 or 42, wherein,
the first indication information indicates the second SSB set based on corresponding relationships between the SSBs in the first SSB set and a first index, the first index being representative of the time-domain positions of the SSBs in the first SSB set in the first transmission window, and the SSBs in the first SSB set corresponding to values of the first index one by one.

44. The apparatus according to supplement 41 or 42, wherein,
the first indication information indicates the second SSB set based on corresponding relationships between the SSBs in the first SSB set and a second index, the second index being representative of quasi-colocation relationships between the SSBs in the first SSB set, and the first SSB set including two SSBs corresponding to identical values of the second index, and the two SSBs corresponding to identical values of the second index being quasi-colocated (QCLed).

45. The apparatus according to supplement 44, wherein, the first indication information further indicates the second SSB set based on corresponding relationships between the SSBs in the first SSB set and a third index, the third index being representative of sequence numbers or time-domain positions of SSBs in a group consisting of the SSBs in the first SSB set corresponding to identical values of the second index in the group, and the SSBs in the group corresponding to values of the third index one by one.

46. The apparatus according to supplement 41, wherein, the first indication information is transmitted via higher-layer signaling or a physical layer dynamic instruction.

47. The apparatus according to supplement 46, wherein, the first indication information is transmitted via RRC signaling,
and the first indication information corresponds to a first parameter or a second parameter,
the first parameter being an existing parameter, and the second parameter being a new parameter.

48. The apparatus according to any one of supplements 32-47, wherein the apparatus further includes:
a third transmitting unit configured to transmit second indication information, the second indication information indicating quasi-colocation relationships between SSBs in the second SSB set.

49. The apparatus according to supplement 48, wherein, the second indication information indicates that a first SSB and a second SSB are quasi-colocated (QCLed), values of the second index to which the first SSB and the second SSB correspond being different.

50. The apparatus according to any one of supplements 32-49, wherein,
the SSBs in the first SSB set correspond to a first index.

51. The apparatus according to any one of supplements 32-50, wherein,
the SSBs in the first SSB set correspond to at least one second index.

52. The apparatus according to supplements 50 or 51, wherein, values of the first index correspond to the SSBs in the first SSB set one by one, the first index being representative of time-domain positions of the SSBs in the first SSB set.

53. The apparatus according to any one of supplements 50-52, wherein,
at least one value of the second index corresponds to at least two SSBs in the first SSB set, and the second index is representative of quasi-colocation relationships between the SSBs in the first SSB set.

54. The apparatus according to any one of supplements 50-52, wherein,
the first index is determined by the indicated second index and a corresponding relationship between the first index and the second index; or
the second index is determined by the indicated first index and a corresponding relationship between the first index and the second index.

55. A data transmission apparatus, configured at a user equipment side, the apparatus including:
a transceiving unit configured to receive a downlink signal and/or channel or transmit an uplink signal and/or channel according to time-domain positions of SSBs in a second SSB set and/or quasi-colocation relationships between the SSBs in the second SSB set,
the second SSB set being a subset of a first SSB set, SSBs in the first SSB set corresponding to different time-domain positions in a transmission window.

56. The apparatus according to supplement 55, wherein the apparatus further includes:
a first determining unit configured to determine the time-domain positions of the SSBs in the second SSB set and/or the quasi-colocation relationships between the SSBs in the second SSB set.

56A. The apparatus according to supplement 56, wherein,
the first determining unit determines the time-domain positions of the SSBs in the second SSB set and/or the quasi-colocation relationships between the SSBs in the second SSB set according to the time-domain positions of SSBs in the first SSB set and/or quasi-colocation relationships between the SSBs in the first SSB set.

56B. The apparatus according to supplement 56A, wherein,
the time-domain positions of SSBs in the first SSB set and/or quasi-colocation relationships between the SSBs in the first SSB set are predefined.

57. The apparatus according to supplement 56, wherein,
the first determining unit determines the time-domain positions of the SSBs in the second SSB set and/or the quasi-colocation relationships between the SSBs in the second SSB set according to received first indication information and/or second indication information,
the first indication information indicating the second SSB set, and second indication information indicating the quasi-colocation relationships between the SSBs in the second SSB set.

58. The apparatus according to supplement 56 or 57, wherein,
the first determining unit determines the quasi-colocation relationships between the SSBs in the second SSB set according to a second index and/or the received second indication information, the second index being indicative of the quasi-colocation relationships between the SSBs in the first SSB set.

59. The apparatus according to any one of supplements 55-58, wherein,
the second SSB set is predefined or preconfigured.

60. The apparatus according to any one of supplements 55-59, wherein,
the first SSB set is predefined.

61. The apparatus according to any one of supplements 55-60, wherein the transceiving unit performs at least one of the following processing according to the time-domain positions of the SSBs in the second SSB set and/or the quasi-colocation relationships between the SSBs in the second SSB set:
monitoring a physical downlink control channel;
receiving a physical downlink data channel;
transmitting an uplink signal and/or channel; and
performing radio link monitoring.

62. The apparatus according to supplement 61, wherein the apparatus further includes:
a second determining unit configured to determine quasi-colocation relationships between the SSBs in the second SSB set and at least one of the physical downlink control channel and the physical downlink data channel according to the second index and/or the received second indication information.

63. A network equipment, including the apparatus as described in any one of supplements 32-54.

64. A user equipment, including the apparatus as described in any one of supplements 55-62.

65. A communication system, including the network equipment as described in supplement 63 and/or the user equipment as described in supplement 64.

What is claimed is:

1. A data transmission apparatus, configured at a network equipment side, the apparatus comprising:
a transmitter configured to, in a first transmission window, transmit at least one synchronization signal block (SSB) in a second SSB set indicated by a first indication information; and
transmit the first indication information, the first indication information indicating the second SSB set based on corresponding relationships between the SSBs in a first SSB set and a second index,
wherein the SSBs corresponding to different time-domain positions in the first transmission window, the second SSB set is a subset of the first SSB set, the second index being representative of quasi-colocation relationships between the SSBs in the first SSB set, and the first SSB set comprising two SSBs corresponding to identical values of the second index, the two SSBs corresponding to identical values of the second index being quasi-colocated (QCLed).

2. The apparatus according to claim 1, wherein, at least one SSB in the second SSB set is not transmitted in the first transmission window.

3. The apparatus according to claim 1, wherein, two SSBs in the second SSB set or the first SSB set are quasi-colocated (QCLed).

4. The apparatus according to claim 1, wherein, time-domain positions of two SSBs in the second SSB set or the first SSB set are overlapped.

5. The apparatus according to claim 1, wherein the apparatus further comprises:
a generating unit configured to generate at least one SSB in the second SSB set corresponding to the first transmission window.

6. The apparatus according to claim 1, wherein in the first transmission window, according to a channel state, the transmitter transmits the at least one SSB in the second SSB set corresponding to the first transmission window, or does not transmit an SSB.

7. The apparatus according to claim 1, wherein the first indication information indicates the second SSB set based on time-domain positions of SSBs in the first SSB set and quasi-colocation relationships between SSBs in the first SSB set.

8. The apparatus according to claim 7, wherein the first indication information indicates the second SSB set based on corresponding relationships between the SSBs in the first SSB set and a first index, the first index being representative of the time-domain positions of the SSBs in the first SSB set in the first transmission window, and the SSBs in the first SSB set corresponding to values of the first index one by one.

9. The apparatus according to claim 1, wherein
the first indication information further indicates the second SSB set based on corresponding relationships between the SSBs in the first SSB set and a third index,
the third index being representative of sequence numbers or time-domain positions of SSBs in a group consisting of the SSBs in the first SSB set corresponding to identical values of the second index in the group, and the SSBs in the group corresponding to values of the third index one by one.

10. The apparatus according to claim 9, wherein,
the first indication information is transmitted via RRC signaling,
and the first indication information corresponds to a first parameter or a second parameter,
the first parameter being an existing parameter, and the second parameter being a new parameter.

11. The apparatus according to claim 1, wherein the apparatus further comprises:
a third transmitter configured to transmit second indication information, the second indication information indicating quasi-colocation relationships between SSBs in the second SSB set.

12. The apparatus according to claim 11, wherein, the second indication information indicates that a first SSB and a second SSB in the second SSB set are quasi-colocated (QCLed), values of the second index to which the first SSB and the second SSB correspond being different.

13. A data transmission apparatus, configured at a user equipment side, the apparatus comprising:
a transceiver configured to receive at least one synchronization signal block (SSB) in a second SSB set indicated by a first indication information in a first transmission window, and
receive the first indication information, the first indication information indicating the second SSB set based on corresponding relationships between the SSBs in a first SSB set and a second index,
wherein the SSBs corresponding to different time-domain positions in the first transmission window, the second SSB set is a subset of the first SSB set, the second index being representative of quasi-colocation relationships between the SSBs in the first SSB set, and the first SSB set comprising two SSBs corresponding to identical values of the second index, the two SSBs corresponding to identical values of the second index being quasi-colocated (QCLed).

14. The apparatus according to claim 13, wherein
the transceiver is further configured to receive a downlink signal and/or channel or transmit an uplink signal and/or channel according to time-domain positions of SSBs in a second SSB set and/or quasi-colocation relationships between the SSBs in the second SSB set.

15. The apparatus according to claim 14, wherein the apparatus further comprises:
a first determining unit configured to determine the time-domain positions of the SSBs in the second SSB set and/or the quasi-colocation relationships between the SSBs in the second SSB set.

16. The apparatus according to claim 15, wherein
the first determining unit determines the time-domain positions of the SSBs in the second SSB set and/or the quasi-colocation relationships between the SSBs in the second SSB set according to received first indication information and/or second indication information,
the second indication information indicating the quasi-colocation relationships between the SSBs in the second SSB set.

17. The apparatus according to claim 16, wherein the first determining unit determines the quasi-colocation relationships between the SSBs in the second SSB set according to the second index and the received second indication information.

18. The apparatus according to claim 14, wherein
the transceiver performs at least one of the following processing according to the time-domain positions of the SSBs in the second SSB set and/or the quasi-colocation relationships between the SSBs in the second SSB set:
monitoring a physical downlink control channel;
receiving a physical downlink data channel;
transmitting an uplink signal and/or channel; and
performing radio link monitoring.

19. The apparatus according to claim 18, wherein the apparatus further comprises:
a second determining unit configured to determine quasi-colocation relationships between the SSBs in the second SSB set and at least one of the physical downlink control channel and the physical downlink data channel according to the second index and the received second indication information.

* * * * *